United States Patent
Merkley et al.

(10) Patent No.: US 11,594,034 B1
(45) Date of Patent: Feb. 28, 2023

(54) TECHNIQUES FOR A SMART MONITORING SYSTEM

(71) Applicant: Vivint, Inc., Provo, UT (US)

(72) Inventors: Logan S. Merkley, American Fork, UT (US); Jason C. Flint, Highland, UT (US); Benjamin A. Clement, American Fork, UT (US); Brandon Bunker, Highland, UT (US); Darin Priday, Saratoga Springs, UT (US); Michelle Zundel, Salt Lake City, UT (US)

(73) Assignee: VIVINT, INC., Provo, UT (US)

( * ) Notice: Subject to any disclaimer, the term of this patent is extended or adjusted under 35 U.S.C. 154(b) by 0 days.

(21) Appl. No.: 17/134,111

(22) Filed: Dec. 24, 2020

Related U.S. Application Data

(63) Continuation-in-part of application No. 17/000,120, filed on Aug. 21, 2020, now Pat. No. 11,244,547.

(51) Int. Cl.
| | |
|---|---|
| *G06V 20/52* | (2022.01) |
| *H04N 7/18* | (2006.01) |
| *H04W 4/02* | (2018.01) |
| *G06N 20/00* | (2019.01) |
| *G08B 13/196* | (2006.01) |

(52) U.S. Cl.
CPC ............ *G06V 20/52* (2022.01); *G06N 20/00* (2019.01); *G08B 13/19656* (2013.01); *H04N 7/181* (2013.01); *H04W 4/023* (2013.01)

(58) Field of Classification Search
CPC ......... G06K 9/00771; G08B 13/19656; G06N 20/00; H04N 7/181; H04W 4/023
See application file for complete search history.

(56) References Cited

U.S. PATENT DOCUMENTS

| | | | |
|---|---|---|---|
| 8,624,735 B2 | 1/2014 | Kellen et al. | |
| 9,342,967 B2 | 5/2016 | Recker et al. | |
| 10,098,211 B2 | 10/2018 | Recker et al. | |
| 10,999,561 B2 * | 5/2021 | Child | H04N 7/186 |
| 2004/0036603 A1 | 2/2004 | Bingham | |
| 2009/0268023 A1 | 10/2009 | Hsieh | |
| 2011/0182323 A1 * | 7/2011 | Horiuchi | G01J 5/34 |
| | | | 374/163 |
| 2011/0261202 A1 * | 10/2011 | Goldstein | G08B 13/19602 |
| | | | 340/541 |
| 2012/0092502 A1 | 4/2012 | Knasel et al. | |
| 2013/0063241 A1 * | 3/2013 | Simon | G08B 25/14 |
| | | | 340/3.1 |
| 2015/0271375 A1 | 9/2015 | Chien | |
| 2015/0305125 A1 | 10/2015 | Chen | |

(Continued)

*Primary Examiner* — Ojiako K Nwugo
(74) *Attorney, Agent, or Firm* — Kunzler Bean & Adamson

(57) ABSTRACT

Methods, systems, and devices that support techniques for a smart monitoring system are described. A system may monitor a physical environment using a camera-enabled device operating in a first mode of a set of modes. The system may determine one or more parameters based on the monitoring. The parameters may include an identity of an entity, a behavior of the entity, or a setting of the security and automation system, or any combination thereof. The system may perform an operation based on the one or more parameters. The techniques described herein may deter an intruder from an intended action (e.g., theft, property damage, etc.) and/or provide lighting to a user of the security and automation system, among other benefits.

18 Claims, 12 Drawing Sheets

(56) References Cited

U.S. PATENT DOCUMENTS

| | | |
|---|---|---|
| 2016/0050397 A1 | 2/2016 | Di Giamberardino et al. |
| 2016/0093180 A1 | 3/2016 | Fitzgibbon et al. |
| 2016/0100086 A1 | 4/2016 | Chien |
| 2016/0173746 A1 | 6/2016 | Chien |
| 2016/0178993 A1 | 6/2016 | Bianciardi |
| 2017/0024996 A1* | 1/2017 | Nold .................. G08B 13/22 |
| 2017/0059265 A1 | 3/2017 | Winter et al. |
| 2017/0236009 A1* | 8/2017 | Zundel ................ G06V 20/52 |
| | | 382/103 |
| 2017/0363262 A1 | 12/2017 | Chien |
| 2018/0061158 A1* | 3/2018 | Greene ................ G06V 20/52 |
| 2018/0249054 A1 | 8/2018 | Chien |
| 2018/0343139 A1* | 11/2018 | Saxena ................ G05B 19/04 |
| 2018/0353774 A1 | 12/2018 | Meir et al. |
| 2019/0049479 A1 | 2/2019 | Malhotra et al. |
| 2019/0200872 A1 | 7/2019 | Matsuoka et al. |
| 2019/0203888 A1 | 7/2019 | Kraz et al. |
| 2019/0253670 A1 | 8/2019 | Chien |
| 2019/0308587 A1 | 10/2019 | Salter et al. |
| 2019/0311287 A1* | 10/2019 | Chew ................ G06Q 30/0202 |
| 2019/0342622 A1 | 11/2019 | Carrigan et al. |
| 2019/0384387 A1 | 12/2019 | Cleveland et al. |
| 2020/0394417 A1* | 12/2020 | Ahmed .................. G06N 3/08 |
| 2020/0398738 A1 | 12/2020 | Lee et al. |

\* cited by examiner

TECHNIQUES FOR A SMART MONITORING SYSTEM

CROSS-REFERENCE TO RELATED APPLICATIONS

This application is a continuation-in-part of U.S. patent application Ser. No. 17/000,120, titled "SMART MONITORING SYSTEM," filed Aug. 21, 2020, pending, the disclosure of which is incorporated by reference herein in its entirety.

BACKGROUND

The present disclosure, for example, relates to security and automation systems, and more particularly to a smart monitoring system in security and automation systems. Security and automation systems are widely deployed in a smart environment (e.g., a residential, a commercial, or an industrial setting) to provide various types of communication and functional features such as monitoring, communication, notification, and/or others. Some security and automation systems may be capable of detecting persons within or proximate to the physical environment. As demand for reliability of security and automation systems increases, some security and automation systems may fail to provide satisfactory detection and other classifications of persons within or relative to the physical environment, and thereby may be unable to support reliable security operations, among other examples.

SUMMARY

The described techniques relate to improved methods, systems, devices, and apparatuses that support a smart monitoring system. Generally, the described techniques provide for enabling a security and automation system to monitor a physical environment, for example, using a camera-enabled device in electronic communication with the security and automation system. The security and automation system may detect a trigger in the physical environment based on the monitoring, for example using the camera-enabled device, a motion sensor, or another sensor. The trigger may be a detected object, person, event, or any combination thereof. The security and automation system may perform one or more actions based on the detected trigger. For example, the security and automation system may select a direction of a plurality of directions to emit light via a light emitting source (e.g., the camera-enabled device). In such examples, the security and automation system may activate the light emitting source and emit the light in the direction based on the activating and the detected trigger. In some examples, the light may be emitted toward a location of a person in the physical environment, an expected (e.g., predicted) location of the person in the physical environment, etc. In some examples, the security and automation system may adjust one or more settings of the light emitting source (e.g., the light may be adjusted to emit light in a strobe-like manner, the light may use a spotlight to track and/or guide a detected intruder, the light may be emitted in a plurality of directions to provide a floodlight upon detection that the individual is known to the system, the light may be adjusted to move in a pattern, among other examples). Additionally or alternatively, the security and automation system may emit sound based at least in part on the detected trigger (e.g., to inform an intruder they are being watched, playing an alarm or siren sound, among other examples). The techniques described herein may deter an intruder from an intended action (e.g., theft, property damage, etc.) and/or provide lighting to a user of the security and automation system, among other benefits.

The security and automation system may implement one or more smart devices. Such devices may enable the system to monitor a premise, determine one or more parameters, and perform an operation. For example, the system may monitor a physical environment (e.g., using a camera-enabled device) and receive one or more inputs based on the monitoring, such as video data, image data, or sound data, among other examples of inputs. The system may determine the one or more parameters based on the monitoring. For example, the system may determine an identity of an entity (e.g., a person, animal, object, etc.), a behavior of the entity, a setting of the system, or any combination thereof. The system may perform an operation in accordance with the one or more determined parameters. For example, the system may illuminate at least a portion of the physical environment (e.g., guide the entity to a reference location, activate a deterrence light, etc.), the system may send a drone or other device targeted at the entity, the system may emit a sound, or any combination thereof. By implementing techniques for a smart monitoring system using the one or more smart devices, the system may influence behaviors of one or more entities, perform actions in accordance with one or more factors (e.g., the system may perform operations based on an identity of a person, a classification of an event, or other factors), or both, which may provide for enhanced user experience and increased security, among other benefits.

A method for a monitoring system is described. The method may be performed by a computing device including at least one processor, such as a camera-enabled device. The method may include monitoring a physical environment using the camera-enabled device, detecting a trigger in the physical environment based on the monitoring, where the trigger includes an object, a person, an event, or any combination thereof, selecting, based on the detecting, a direction of a set of directions to emit light via a light emitting source, activating the light emitting source based on the selecting, and emitting, via the light emitting source, the light in the direction based on the activating and the detected trigger.

An apparatus for a monitoring system is described. The apparatus may include a processor, memory in electronic communication with the processor, and instructions stored in the memory. The instructions may be executable by the processor to cause the apparatus to monitor a physical environment using a camera-enabled device, detect a trigger in the physical environment based on the monitoring, where the trigger includes an object, a person, an event, or any combination thereof, select, based on the detecting, a direction of a set of directions to emit light via a light emitting source, activate the light emitting source based on the selecting, and emit, via the light emitting source, the light in the direction based on the activating and the detected trigger.

Another apparatus for a monitoring system is described. The apparatus may include means for monitoring a physical environment using a camera-enabled device, means for detecting a trigger in the physical environment based on the monitoring, where the trigger includes an object, a person, an event, or any combination thereof, means for selecting, based on the detecting, a direction of a set of directions to emit light via a light emitting source, means for activating the light emitting source based on the selecting, and means for emitting, via the light emitting source, the light in the direction based on the activating and the detected trigger.

A non-transitory computer-readable medium storing code for a monitoring system is described. The code may include instructions executable by a processor to monitor a physical environment using a camera-enabled device, detect a trigger in the physical environment based on the monitoring, where the trigger includes an object, a person, an event, or any combination thereof, select, based on the detecting, a direction of a set of directions to emit light via a light emitting source, activate the light emitting source based on the selecting, and emit, via the light emitting source, the light in the direction based on the activating and the detected trigger.

Some examples of the method, apparatuses, and non-transitory computer-readable medium described herein may further include operations, features, means, or instructions for determining a location of the person in the physical environment based on information from the camera-enabled device, where selecting the direction of the set of directions to emit the light via the light emitting source may be based on the location of the person in the physical environment.

In some examples of the method, apparatuses, and non-transitory computer-readable medium described herein, the direction includes a direction towards the location of the person in the physical environment.

Some examples of the method, apparatuses, and non-transitory computer-readable medium described herein may further include operations, features, means, or instructions for determining an expected location of the person in the physical environment based on one or more characteristics of the person, where selecting the direction of the set of directions to emit the light via the light emitting source may be based on the expected location of the person in the physical environment.

Some examples of the method, apparatuses, and non-transitory computer-readable medium described herein may further include operations, features, means, or instructions for tracking a movement of the person in the physical environment from the location to a second location using the camera-enabled device, selecting, based on the tracking, a second direction of the set of directions to emit the light via the light emitting source, and emitting, via the light emitting source, the light in the second direction based on the selecting.

Some examples of the method, apparatuses, and non-transitory computer-readable medium described herein may further include operations, features, means, or instructions for initiating a timer based on detecting the person in the physical environment, determining an expiration of the timer, determining that the person remains in the physical environment after the expiration of the timer, and adjusting a parameter of the light emitting source based on the expiration of the timer and the person remaining in the physical environment.

In some examples of the method, apparatuses, and non-transitory computer-readable medium described herein, adjusting the parameter of the light emitting source may include operations, features, means, or instructions for initiating a strobe pattern of the light emitting source, the strobe pattern corresponding to a periodicity of emitting the light, where emitting, via the light emitting source, the light in the direction may be based on the strobe pattern.

Some examples of the method, apparatuses, and non-transitory computer-readable medium described herein may further include operations, features, means, or instructions for refraining from emitting the light in the direction for a time period in accordance with the periodicity, and emitting, via the light emitting source, the light in the direction for a second time period in accordance with the periodicity.

In some examples of the method, apparatuses, and non-transitory computer-readable medium described herein, adjusting the parameter of the light emitting source may include operations, features, means, or instructions for initiating a sweep pattern of the light emitting source, the sweep pattern corresponding to a motion of emitting the light, where emitting, via the light emitting source, the light in the direction may be based on the sweep pattern.

Some examples of the method, apparatuses, and non-transitory computer-readable medium described herein may further include operations, features, means, or instructions for initiating a timer based on detecting the person in the physical environment, determining an expiration of the timer, determining an absence of the person in the physical environment before the expiration of the timer, and deactivating the light emitting source based on the expiration of the timer and the absence of the person in the physical environment.

Some examples of the method, apparatuses, and non-transitory computer-readable medium described herein may further include operations, features, means, or instructions for identifying, using the camera-enabled device, the person in the physical environment based on detecting the person.

Some examples of the method, apparatuses, and non-transitory computer-readable medium described herein may further include operations, features, means, or instructions for capturing an image or a video of the person using the camera-enabled device, performing an identification operation based on the captured image or video, where the identification operation includes a facial recognition, a license plate recognition, a time sequenced analysis, or any combination thereof, determining, based on the identifying, that the person may be a known user associated with the monitoring system, where emitting the light includes, and emitting, via the light emitting source, the light in each of the set of directions based on the person being the known user associated with the monitoring system.

In some examples of the method, apparatuses, and non-transitory computer-readable medium described herein, the person may include operations, features, means, or instructions for emitting, via the light emitting source, the light in a directional manner, a strobe pattern, or a sweep pattern based on the unknown person associated with the monitoring system.

Some examples of the method, apparatuses, and non-transitory computer-readable medium described herein may further include operations, features, means, or instructions for operating the camera-enabled device in a mode based on a configuration of the camera-enabled device or an input from a user of the monitoring system, or both.

Some examples of the method, apparatuses, and non-transitory computer-readable medium described herein may further include operations, features, means, or instructions for receiving one or more inputs from one or more devices associated with the monitoring system, where monitoring the physical environment may be based on the one or more inputs.

In some examples of the method, apparatuses, and non-transitory computer-readable medium described herein, the one or more devices include the camera-enabled device, one or more distributed devices associated with the monitoring system, one or more motion sensors, one or more cameras, one or more radio frequency radars, one or more infrared sensors, one or more audio sensors, or any combination thereof.

In some examples of the method, apparatuses, and non-transitory computer-readable medium described herein, the one or more inputs include one or more video inputs, one or more image inputs, one or more sensor inputs, one or more audio inputs, or any combination thereof.

In some examples of the method, apparatuses, and non-transitory computer-readable medium described herein, the event includes an arrival, a departure, a presence, an absence, a behavior, a weather event, an audio event, a security event, or any combination thereof.

In some examples of the method, apparatuses, and non-transitory computer-readable medium described herein, the light includes visible light, infrared light, or a combination thereof.

Some examples of the method, apparatuses, and non-transitory computer-readable medium described herein may further include operations, features, means, or instructions for selecting, based on the detecting, a direction of a set of directions to emit sound via a sound emitting source, activating the sound emitting source based on the selecting, and emitting, via the sound emitting source, the sound in the direction based on the activating, where the sound includes an audible frequency, an ultrasonic frequency, an infrasonic frequency, or any combination thereof.

Some examples of the method, apparatuses, and non-transitory computer-readable medium described herein may further include operations, features, means, or instructions for determining an expected location of the person in the physical environment, where selecting the direction and activating the sound emitting source may be based on the expected location of the person in the physical environment.

Some examples of the method, apparatuses, and non-transitory computer-readable medium described herein may further include operations, features, means, or instructions for initiating a timer based on detecting the person in the physical environment, determining an expiration of the timer, determining that the person remains in the physical environment after the expiration of the timer, and adjusting a parameter of the sound emitting source based on the expiration of the timer and the person remaining in the physical environment.

Some examples of the method, apparatuses, and non-transitory computer-readable medium described herein may further include operations, features, means, or instructions for adjusting one or more parameters of the light emitting source based on detecting the trigger, where the one or more parameters of the light emitting source include a location, a shape, a wavelength, a color temperature, an intensity, a periodicity, a temporal pattern, a spatial pattern, a duty cycle, a synchronization with a camera shutter speed, or any combination thereof.

Some examples of the method, apparatuses, and non-transitory computer-readable medium described herein may further include operations, features, means, or instructions for emitting the light in a first configuration based on detecting a first individual in the physical environment, detecting a set of individuals in the physical environment, and emitting the light in accordance with a second configuration based on detecting the set of individuals in the physical environment.

A method for a security and automation system is described. The method may include monitoring a physical environment using a camera-enabled device operating in a first mode of a set of modes, determining one or more parameters based at least in part on the monitoring, the one or more parameters comprising an identity of an entity, a behavior of the entity, or a setting of the security and automation system, or any combination thereof, and performing an operation using the security and automation system based at least in part on the one or more parameters.

An apparatus for a security and automation system is described. The apparatus may include a processor, memory in electronic communication with the processor, and instructions stored in the memory. The instructions may be executable by the processor to cause the apparatus to monitor a physical environment using a camera-enabled device operating in a first mode of a set of modes, determine one or more parameters based at least in part on the monitoring, the one or more parameters comprising an identity of an entity, a behavior of the entity, or a setting of the security and automation system, or any combination thereof, and perform an operation using the security and automation system based at least in part on the one or more parameters.

Another apparatus for a security and automation system is described. The apparatus may include means for monitoring a physical environment using a camera-enabled device operating in a first mode of a set of modes, means for determining one or more parameters based at least in part on the monitoring, the one or more parameters comprising an identity of an entity, a behavior of the entity, or a setting of the security and automation system, or any combination thereof, and means for performing an operation using the security and automation system based at least in part on the one or more parameters.

A non-transitory computer-readable medium storing code for a security and automation system is described. The code may include instructions executable by a processor to monitor a physical environment using a camera-enabled device operating in a first mode of a set of modes, determine one or more parameters based at least in part on the monitoring, the one or more parameters comprising an identity of an entity, a behavior of the entity, or a setting of the security and automation system, or any combination thereof, and perform an operation using the security and automation system based at least in part on the one or more parameters.

Some examples of the method, apparatuses, and non-transitory computer-readable medium described herein may further include operations, features, means, or instructions for determining that the one or more parameters satisfy one or more thresholds during a first temporal period and switching from the first mode to a second mode of the set of modes based at least in part on the one or more parameters satisfying the one or more thresholds during the first temporal period, wherein performing the operation may be based at least in part on the camera-enabled device operating in the second mode.

Some examples of the method, apparatuses, and non-transitory computer-readable medium described herein may further include operations, features, means, or instructions for determining, during a second temporal period, that the one or more parameters fail to satisfy the one or more thresholds and switching from the second mode to the first mode during the second temporal period based at least in part on the one or more parameters failing to satisfy the one or more thresholds.

Some examples of the method, apparatuses, and non-transitory computer-readable medium described herein may further include operations, features, means, or instructions for receiving one or more inputs from one or more devices including the camera-enabled device based at least in part on monitoring the physical environment, the one or more inputs comprising a video input, an image input, or an audio input, or any combination thereof, wherein determining the one or more parameters comprises and analyzing the one or more inputs using one or more learning models.

Some examples of the method, apparatuses, and non-transitory computer-readable medium described herein may further include operations, features, means, or instructions for determining a classification of an event or a localization of the event, or both, based at least in part on analyzing the one or more inputs and wherein performing the operation may be based at least in part on the classification of the event or the localization of the event, or both.

In some examples of the method, apparatuses, and non-transitory computer-readable medium described herein, analyzing the one or more inputs may include operations, features, means, or instructions for inputting the one or more inputs to a machine learning module of the camera-enabled device and outputting, from the machine learning module, one or more outputs indicating a classification of the one or more inputs or a localization of the one or more inputs, or a combination thereof.

In some examples of the method, apparatuses, and non-transitory computer-readable medium described herein, performing the operation may include operations, features, means, or instructions for determining a reference location for the entity based at least in part on the one or more parameters and illuminating, via a light source associated with the camera-enabled device, at least a portion of the physical environment based at least in part on determining the reference location, wherein the portion of the physical environment may be between an actual location of the entity and the reference location.

In some examples of the method, apparatuses, and non-transitory computer-readable medium described herein, performing the operation may include operations, features, means, or instructions for emitting a sound, emitting a light, spraying water, releasing a drone, emitting one or more lasers, projecting or capturing an image or video or both, sending a message to a user of the security and automation system, activating one or more lighting sources, or a combination thereof based at least in part on the identity of the entity and wherein the emitted sound or the emitted light, or both may be targeted to the entity.

In some examples of the method, apparatuses, and non-transitory computer-readable medium described herein, performing the operation may include operations, features, means, or instructions for sweeping a light of the camera-enabled device across the physical environment, strobing the light, flashing the light, or a combination thereof based at least in part on operating in a second mode.

Some examples of the method, apparatuses, and non-transitory computer-readable medium described herein may further include operations, features, means, or instructions for determining that the entity may have remained in the physical environment for a threshold duration of time and adjusting one or more parameters of the light based at least in part on determining that the entity may have remained in the physical environment for the threshold duration of time.

In some examples of the method, apparatuses, and non-transitory computer-readable medium described herein, performing the operation may include operations, features, means, or instructions for emitting a sound in the physical environment based at least in part on operating in a second mode.

Some examples of the method, apparatuses, and non-transitory computer-readable medium described herein may further include operations, features, means, or instructions for determining that the entity may have remained in the physical environment for a threshold duration of time and adjusting one or more parameters of the sound based at least in part on determining that the entity may have remained in the physical environment for the threshold duration of time.

Some examples of the method, apparatuses, and non-transitory computer-readable medium described herein may further include operations, features, means, or instructions for performing the operation for a first temporal period, analyzing, for the first temporal period, the behavior of the entity based at least in part on performing the operation, and adjusting one or more parameters of the operation based at least in part on the analyzing.

Some examples of the method, apparatuses, and non-transitory computer-readable medium described herein may further include operations, features, means, or instructions for determining that the behavior of the entity satisfies one or more thresholds.

In some examples of the method, apparatuses, and non-transitory computer-readable medium described herein, adjusting the one or more parameters may include operations, features, means, or instructions for performing a second operation using the camera-enabled device based at least in part on the behavior of the entity satisfying the one or more thresholds.

In some examples of the method, apparatuses, and non-transitory computer-readable medium described herein, adjusting the one or more parameters may include operations, features, means, or instructions for ceasing performing the operation based at least in part on the behavior of the entity satisfying the one or more thresholds.

Some examples of the method, apparatuses, and non-transitory computer-readable medium described herein may further include operations, features, means, or instructions for analyzing a result of the operation, adjusting the setting of the security and automation system based at least in part on analyzing the result, and performing a second operation different than the operation using the camera-enabled device based at least in part on the camera-enabled device operating in a second mode of the set of modes and the adjusted setting.

In some examples of the method, apparatuses, and non-transitory computer-readable medium described herein, the first mode corresponds to a first security level and a second mode corresponds to a second security level different from the first security level.

DETAILED DESCRIPTION

Figure 1:
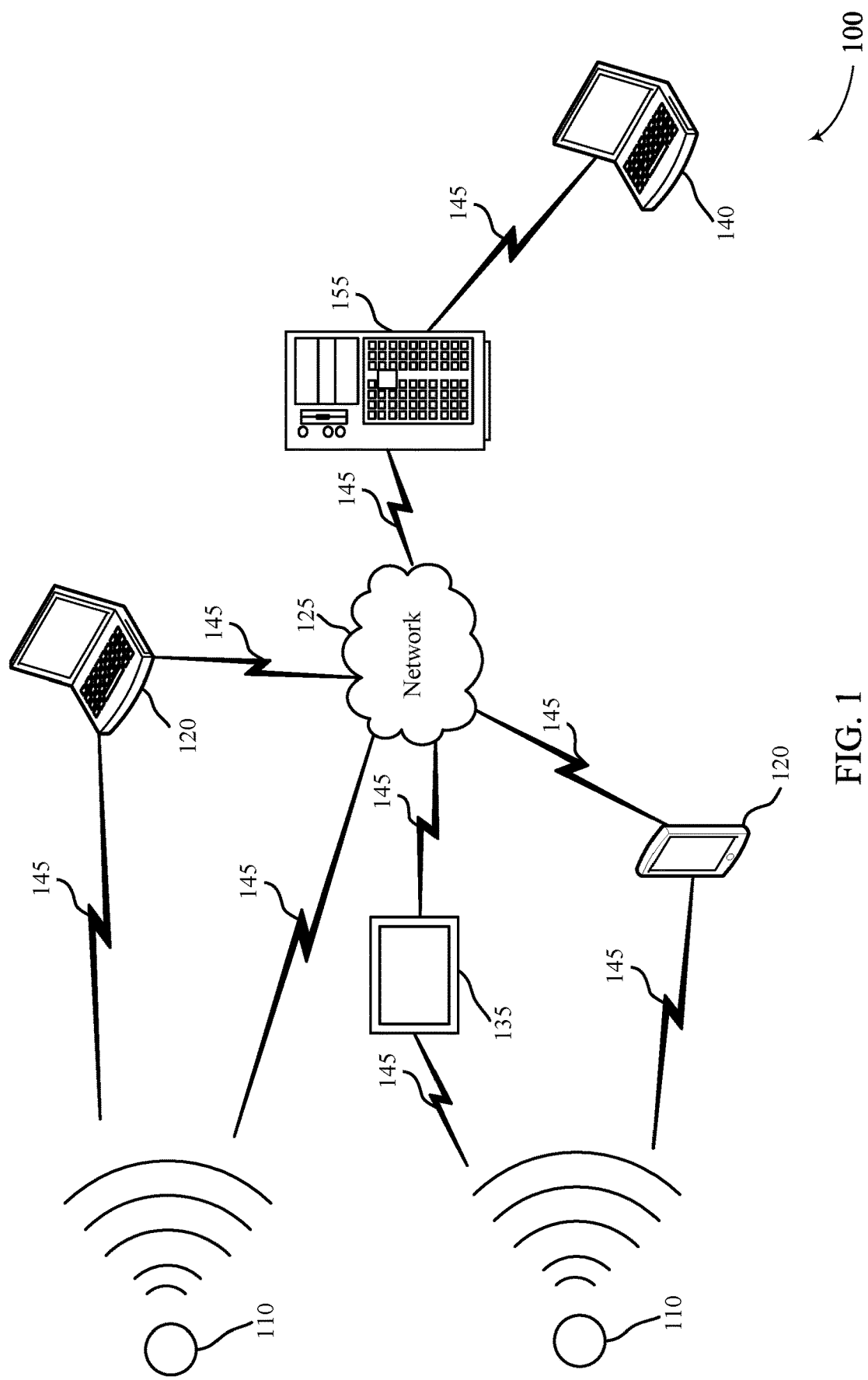
FIG. 1 illustrates an example of a system that supports a smart monitoring system in accordance with aspects of the present disclosure.

Present security and automation systems, e.g., for homes and commercial businesses, have become commonplace as people seek to guard themselves and their property. These security and automation systems may employ sensors at entry and exit points, along with interior sensors (e.g., motion detectors, sound sensors, and glass break sensors) for determining entry or exit into or out of a property. In addition, these security and automation systems may employ security cameras that perform various operations related to crime or other circumstances. More specifically, the systems and methods described herein relate to a smart monitoring system for monitoring a physical environment or zone, for example, for one or more intruders, events, objects, etc., among other examples of triggers to take one or more actions. The term "home" used throughout this document generically refers to any dwelling or property that is monitored by such a monitoring system such as an automation system and/or a security system. An automation system may include automation and security features. The term "security and automation system" may be used herein to describe a security system, an automation system, a smart home security and/or automation system, a smart monitoring system, or any combination thereof, which may provide automation and/or security functionality.

According to the techniques described herein, a security and automation system may be configured to implement one or more smart monitoring techniques as described herein. The security and automation system may include a camera-enabled device configured to monitor a physical environment (e.g., a zone of a premises, an outdoor portion of the premises, etc.). The camera-enabled device may be a stand-alone camera or a non-standalone camera. In some examples, the camera-enabled device may be a smart outdoor camera (ODCP). The described techniques may relate to configuring the camera-enabled device with a light emitting source to support enhanced security and visibility at the physical environment.

The security and automation system may detect a trigger in the physical environment (e.g., in a geo-boundary associated with a premise such as an outdoor area of a smart-home) based on the monitoring. For example, the camera-enabled device may detect a presence of a person in the physical environment, an object, an event, or any combination thereof, among other examples of triggers. In some examples, the security and automation system may detect a presence of a person and may determine an identity of the person. For example, the security and automation system may be configured to determine the identity of the person using one or more facial recognition algorithms. In some examples, the security and automation systems may determine, based on using the one or more facial recognition algorithms, that the identity of the person matches a profile of an occupant of the smart-home. Alternatively, the security and automation system may determine, based on using the one or more facial recognition algorithms, that the identity of the person does not match a profile of an occupant of the smart-home. In other words, the person is unknown and may be a potential threat (e.g., an intruder intending to commit a crime) to the smart-home.

The security and automation system may perform one or more actions based on the detected trigger. In some examples, the security and automation system may be configured to operate in various modes. For example, the security and automation system may be configured to operate in a first mode (also referred to as a security mode) during pre-configured hours of a day, based on an input from a person, among other examples. In some examples, a camera-enabled device in electronic communication with the security and automation system may activate a light emitting source based on the detection of a trigger (e.g., person detection and/or classifications related to the person). For example, the security and automation system may select a direction of a plurality of directions to emit light via a light emitting source (e.g., the camera-enabled device). In such examples, the security and automation system may activate the light emitting source and emit the light in the direction based on the activating and the detected trigger. In some examples, the emission of the light may function as a warning mode to an unknown person. Additionally or alternatively, the emission of the light may have a characteristic of a floodlight to illuminate an area (e.g., a driveway of the physical environment) for a known person of the security and automation system.

In some examples, the security and automation system may adjust one or more settings. For example, the light emitting source may be configured to emit a visible light towards (e.g., a spotlight on the person) a location of the person within the geo-boundary (e.g., the driveway) associated with the smart-home. In some examples, the direction of the emitted light may be towards an expected (e.g., predicted) locations of the person, the light may guide the person to a desired location, the light may follow a movement of the person (e.g., the light may continuously track the person), the light emitting source may illuminate a first location of the person at a first time, identify a second location of the person at a second time, and illuminate the second location of the person, etc. In some other examples, the light emitting source may be configured to emit a visible light with a "strobe" effect (e.g., flashing on and off repeatedly). For example, the light emitting source may be configured to emit a visible light according to a periodicity. In other examples, the light emitting source may be configured to emit a visible light according to a motion profile. For example, the light emitting source may be configured to move in a sweeping pattern (e.g., sweep back and forth) upon being activated. The sweeping pattern may relate to an angular orientation of the light emitting source.

Additionally or alternatively, the security and automation system may emit sound based at least in part on the detected trigger (e.g., audible sound, ultrasonic sound, infrasonic sound, etc., may be emitted to deter an intruder, identify a detected person, object, or event, among other examples). In some examples, emitting the sound and/or light based on detecting the trigger may be based on a threshold. For example, the security and automation systems may determine that a person has remained within the geo-boundary of the smart-home for a duration that satisfies a threshold (e.g., the person has remained on a premise for a time period longer than a pre-configured timer). The security and automation systems may modify one or more parameters based on the satisfied threshold. For instance, the security and automation systems may enable a strobe effect of the light, a motion of the visible light (e.g., sweeping back and forth), play a warning message or alarm sound, or a combination thereof. In some examples, the security and automation systems may deactivate (e.g., turn off) the light emitting source and/or the sound emitting source based on detecting that the person has left the geo-boundary of the smart-home.

In some examples, the security and automation system may implement one or more smart monitoring techniques as described herein. For example, the system may monitor a physical environment. The system may be configured to receive a set of inputs from one or more sensors (e.g., smart devices such as camera-enabled devices). The set of inputs may include video input, sound input, audio input, image input, user input, light input (e.g., infrared input), or any combination thereof, among other examples of sensor inputs. In some examples, the system may include one or more components providing the input. For example, the system may include cameras (e.g., a camera-enabled device as described herein) or sound sensors, among other examples of sensors as described herein. The system may receive the inputs at a device, such as a control panel. For example, the sensors may be configured to report data (e.g., sensor data) to the system (e.g., the control panel) via wired or wireless communications.

The system may determine one or more parameters based on the monitoring. For example, the system may process (e.g., analyze, filter, input to a learning model such as an artificial intelligence (AI) algorithm, etc.) the set of inputs in accordance with any of the examples described herein. As an illustrative example, the system may input the one or more inputs to a machine learning module and output one or more outputs indicating a classification of the one or more inputs, a localization of the one or more inputs, or both, among other examples of outputs. Such processing may enable the system to determine the one or more parameters and intelligently perform an action based on the one or more parameters. For example, the system may determine an identity of one or more entities (e.g., a person, an object, an animal, an event, and the like), a behavior of an entity, a setting of the security and automation system, or any combination thereof based on processing the inputs from the components of the system.

The system may perform an operation in accordance with the one or more parameters. For example, the system may perform a first action for a first identity of a person or a second action for a second identity of a person, a setting of the system may indicate an action to perform for a classification of the event or entity, the system may perform an action targeted at an entity, or any combination thereof. In some examples, the system may perform one or more operations which may affect a detected behavior of an entity. For example, the system may emit a light, emit a sound, spray water, release a drone, emit one or more lasers, project an image, send a message, record an event (e.g., capture image or video data), activate one or more lighting sources, or any combination thereof. In some examples, such operations may be targeted towards an entity (e.g., projecting a light or sound to deter a person from performing a predicted event, lighting a pathway from the driveway to the door if the identity of the person indicates a user of the system, etc.), which may influence behavior of the entity (e.g., guide a person off the property), enhance a user experience, or both.

In some examples, the system may operate in one or more modes as described herein. For example, the system may operate in a first mode during a first temporal period. The system may perform one or more operations based on operating in the first mode. For example, the first mode may be an example of a relatively low security mode. The system may implement relatively less aggressive actions based on operating in the first mode (e.g., the system may light a pathway for one or more people or send a notification of a detected event to a user). Additionally or alternatively, the system may operate in a second mode during the first temporal period or a second temporal period. For example, the second mode may be an example of a relatively high security mode. In such examples, the system may implement relatively more aggressive actions based on operating in the second mode (e.g., the system may perform deterrence actions such as flashing or strobing a light, spraying water, emitting lasers at an entity, or other targeted actions).

In some cases, the system may determine whether to operate in the first mode or the second mode based on the one or more parameters. For example, the system may switch from operating in the first mode to the second mode, or vice versa, based on a time of day, analysis of a behavior or identity of an entity, one or more settings of the system, or any combination thereof. As another illustrative example, the system may initially perform a first operation and analyze the behavior of an entity (e.g., the system detects a person approaching a car and determines that the person may intend to break into the car, and the system initiates the first operation). If the behavior of the entity is unaffected by the first operation (e.g., shining a light on the entity and/or the car), the system may perform a second operation (e.g., the system may begin strobing or flashing the light, emitting water or sounds or lasers, sending a drone after the entity, etc.). In some cases, the system may switch from the first mode to the second mode and perform the second operation based on switching modes.

In some examples, the system may perform an operation based on a classification or a localization of an event. For example, the system may determine the classification or the localization or both of the event based on processing the inputs (e.g., an output of a machine learning module may indicate the localization or classification or both). As an illustrative example, the system may identify a first classification at a first time. The system may perform a first action in accordance with the first classification (e.g., the system may initially flash a light or emit a request to leave the property for a low risk classification of the event). Additionally, or alternatively, the system may identify a second classification based on performing the first action. For example, the system may determine that a likelihood of the predicted event is relatively higher (e.g., if the first action fails to dissuade or alter the behavior of the person, the system may transition to a second stage of action). As an illustrative example, the system may call authorities, send a drone or ground robot, spray water or laser at the person, switch the light or sound to a more aggressive action (e.g., higher intensity light or louder sounds), among other examples. The system may perform an action based on the localization of the entity or event (e.g., the system may target an operation towards the location of the entity). In some examples, the system may perform the action based on an identity of the person. For example, the system may be configured to perform actions directed to an individual (e.g., the system may announce "Steven, please leave the property" or otherwise indicate that the person has been identified, the system may be configured to perform a first action for a first person and a second action for a second person, etc.).

In some examples, the system may perform an operation based on machine learning. For example, the system may analyze a result of an operation. The system may configure settings automatically based on analyzing the results of operations. For example, the system may determine that an operation was relatively successful (e.g., a possible criminal was deterred using a first sound or light or other action), and may adjust a setting of the system to implement the successful operation (e.g., the system may refrain from performing operations that have been historically unsuccessful). As one illustrative example, if a first emitted sound fails to deter an entity, the system may adjust a setting to emit a second sound upon detecting a similar or identical set of inputs, although any operation may be implemented (e.g., lights, water, drones, etc.).

Aspects of the disclosure are initially described in the context of security and automation systems. Aspects of the disclosure are further illustrated by and described with reference to security and automation environments and a process flow. Aspects of the disclosure are further illustrated by and described with reference to apparatus diagrams, system diagrams, and flowcharts that relate to a smart monitoring system.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates an example of a system 100 that supports a smart monitoring system in accordance with aspects of the present disclosure. The system 100 may be referred to as a home automation system, a monitoring system, a security and automation system, a home security system, an automation system, or any combination thereof. The system 100 may include one or more sensor units 110, one or more local computing devices 120, control panel 135, remote computing device 140, and server 155. The network 125 may provide personal authentication credentials, encryption, access authorization, tracking, Internet Protocol (IP) connectivity, and other access, computation, modification, and/or functions. The control panel 135 may interface with the network 125 through a first set of wired and/or wireless communication links 145 to communicate with the server 155. The control panel 135 may perform communication configuration, adjustment, and/or scheduling for communication with the local computing device 120 and remote computing device 140 or may operate under the control of a controller. Control panel 135 may communicate with a back-end server (such as the server 155)—directly and/or indirectly—using the first set of one or more wireless communication links 145. In some examples, the server 155 may be a remote server located at a location different or same from the control panel 135, the local computing device 120, and/or the remote computing device 140.

The control panel 135 may wirelessly communicate with the remote computing device 140 and the local computing device 120 by way of one or more antennas. The control panel 135 may provide communication coverage for a respective coverage area (e.g., residential, commercial). In some examples, the control panel 135 may be referred to as a control device, a controller, a base transceiver station, a radio base station, an access point, a radio transceiver, or some other suitable terminology. The coverage area for a control panel 135 may be divided into sectors making up only a portion of the coverage area. The system 100 may include control panels of different types. In some examples, the system 100 may include overlapping coverage areas for one or more different parameters, including different technologies, features, subscriber preferences, hardware, software, technology, and/or methods.

For example, one or more control panels may be related to one or more discrete structures (e.g., a house, a business) and each of the one more discrete structure may be related to one or more discrete areas (e.g., multiple houses in a neighborhood). In other examples, multiple control panels may be related to the same one or more discrete structures (e.g., multiple control panels relating to a house and/or a business complex). For example, one or more control panels may be located within a house. Additionally or alternatively, each room within the house may have a designated control panel located within each room. In some cases, the one or more control panels may communicate with one another via one or more communication protocols. In some examples, the one or more control panels may form a mesh network within the house and communicate with one another via the mesh network. In some examples, a control panel may modify or update a security parameter based on information received from one or more other control panels in the mesh network.

The local computing device 120 or remote computing device 140 may be dispersed throughout the system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors), a printer, a camera, and/or the like. The local computing device 120 and/or remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, control panel 135 may be a smart home system panel, for example, an interactive panel mounted on a wall or other surface in a person's home. Control panel 135 may be in direct communication via wired or wireless communication links 145 with the one or more sensor units 110, or may receive sensor data from the one or more sensor units 110 via local computing device 120 and network 125, or may receive data via remote computing device 140, server 155, and network 125. Additionally or alternatively, the control panel 135 may wirelessly communicate with the sensor units 110 via one or more antennas. The sensor units 110 may be dispersed throughout the system 100 and each sensor unit 110 may be stationary and/or mobile. Sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system.

The local computing device 120, remote computing device 140, and/or a sensor units 110 may be able to communicate through one or more wired and/or wireless connections with various components such as a control panel, base stations, and/or network equipment (e.g., servers, wireless communication points) and/or the like. In some examples, one or more sensor units 110 may be located within a structure, e.g., house. Additionally or alternatively, in some examples, the structure may have a designated sensor unit located within one or more predetermined areas, e.g., rooms. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels.

The wireless communication links 145 shown in the system 100 may include uplink transmissions from a local computing device 120 to a control panel 135, and/or downlink transmissions, from a control panel 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, of the system 100, control panel 135, local computing device 120, and/or remote computing device 140 may include one or more antennas for employing antenna diversity schemes to improve communication quality and reliability between control panel 135, local computing device 120, and remote computing device 140. Additionally or alternatively, control panel 135, local computing device 120, and/or remote computing device 140 may employ multiple-input, multiple-output (MIMO) techniques that may take advantage of multi-path, mesh-type environments to transmit multiple spatial layers carrying the same or different coded data.

While the local computing device 120 and/or remote computing device 140 may communicate with each other through the control panel 135 using wireless communication links 145, the local computing device 120 and/or remote computing device 140 may also communicate directly with one or more other devices via one or more direct communication links (not shown). Examples of direct communication links may include Wi-Fi Direct, BLUETOOTH®, wired, and/or, and other P2P group connections. The control panel 135, local computing device 120, and/or remote computing device 140 in these examples may communicate according to the WLAN radio and baseband protocol including physical and medium access control (MAC) layers from Institute of Electrical and Electronics Engineers (IEEE) 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within system 100.

In an example, local computing device 120 and remote computing device 140 may be custom computing entities configured to interact with sensor units 110 via network 125, and in some examples, via server 155. In other examples, local computing device 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module.

The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled with the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person.

In some examples, the sensor units 110 may be separate from the control panel 135 and may be positioned at various locations throughout the house or the property. In other examples, the sensor units 110 may be integrated or collocated with other house and/or building automation system components, home appliances, and/or other building fixtures. For example, a sensor unit 110 may be integrated with a doorbell or door intercom system or may be integrated with a front entrance light fixture. In other examples, a sensor unit 110 may be integrated with a wall outlet and/or switch. In other examples, the sensor units 110 may be integrated and/or collocated with the control panel 135 itself. In some examples, each of the sensor units 110, control panel 135, and/or local computing device 120 may include a speaker unit, a microphone unit, and/or a camera unit, among other things.

In some cases, a property may be monitored by the control panel 135 and/or sensor units 110. In some examples, the control panel 135 may include sensor units 110 such that the control panel 135 may directly receive signals (e.g., motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing. In some examples, occupancy may be detected by any one of a motion sensor, audio sensor, radio frequency identification (RFID) sensor, video camera, light-break sensor, or a combination thereof. In some examples, the sensor units 110 may be separate from the control panel 135, and may be positioned at various locations, also referred to herein as zones, throughout a property. In other examples, the sensor units 110 may be integrated or collocated with other security and automation system components. For example, a sensor unit 110 may be integrated with a wall, door, window for detecting entry and/or exit of a person relative to the property. In other examples, the sensor units 110 may be integrated or collocated with the control panel 135 itself.

The control panel 135 in communication with the sensor units 110 may receive sensor data associated with at least one sensor of a home automation system. In some examples, the control panel 135 may receive a trigger to perform a security function associated with a home automation system. In some examples, the security function may be instructions to arm or disarm a property (i.e., activate alarm parameters). After receiving the instructions, the control panel 135 may determine one or more settings associated with the system 100. In some examples, a sensor unit 110 may be an example of a camera or a camera-enabled device in electronic communication with the system 100. The system 100 may implement the techniques described herein to monitor a physical environment, for example, using the camera-enabled device (e.g., the camera-enabled device may be a standalone device or sensor unit 110 including a camera, a control panel 135 in communication with a camera, a lighting and/or sound emitting device in communication with a camera, among other examples). The system 100 may detect a trigger in the physical environment based on the monitoring, for example using the camera-enabled device, a motion sensor, or another sensor unit 110. The trigger may be a detected object, person, event, or any combination thereof. The system 100 may perform one or more actions based on the detected trigger.

For example, the system 100 may select a direction of a plurality of directions to emit light via a light emitting source (e.g., the camera-enabled device). In such examples, the system 100 may activate the light emitting source and emit the light in the direction based on the activating and the detected trigger. In some examples, the system 100 may adjust one or more settings of the light emitting source (e.g., the light may be adjusted to emit light in a strobe-like manner, the light may use a spotlight to track and/or guide a detected intruder, the light may be emitted in a plurality of directions to provide a floodlight upon detection that the individual is known to the system, the light may be adjusted to move in a pattern, among other examples). Additionally or alternatively, the system 100 may emit sound based at least in part on the detected trigger (e.g., to inform an intruder they are being watched and/or identified, playing an alarm or siren sound, among other examples). The techniques described herein may deter an intruder from an intended action (e.g., theft, property damage, etc.) and/or provide lighting to a user of the system 100, among other benefits.

Figure 2:
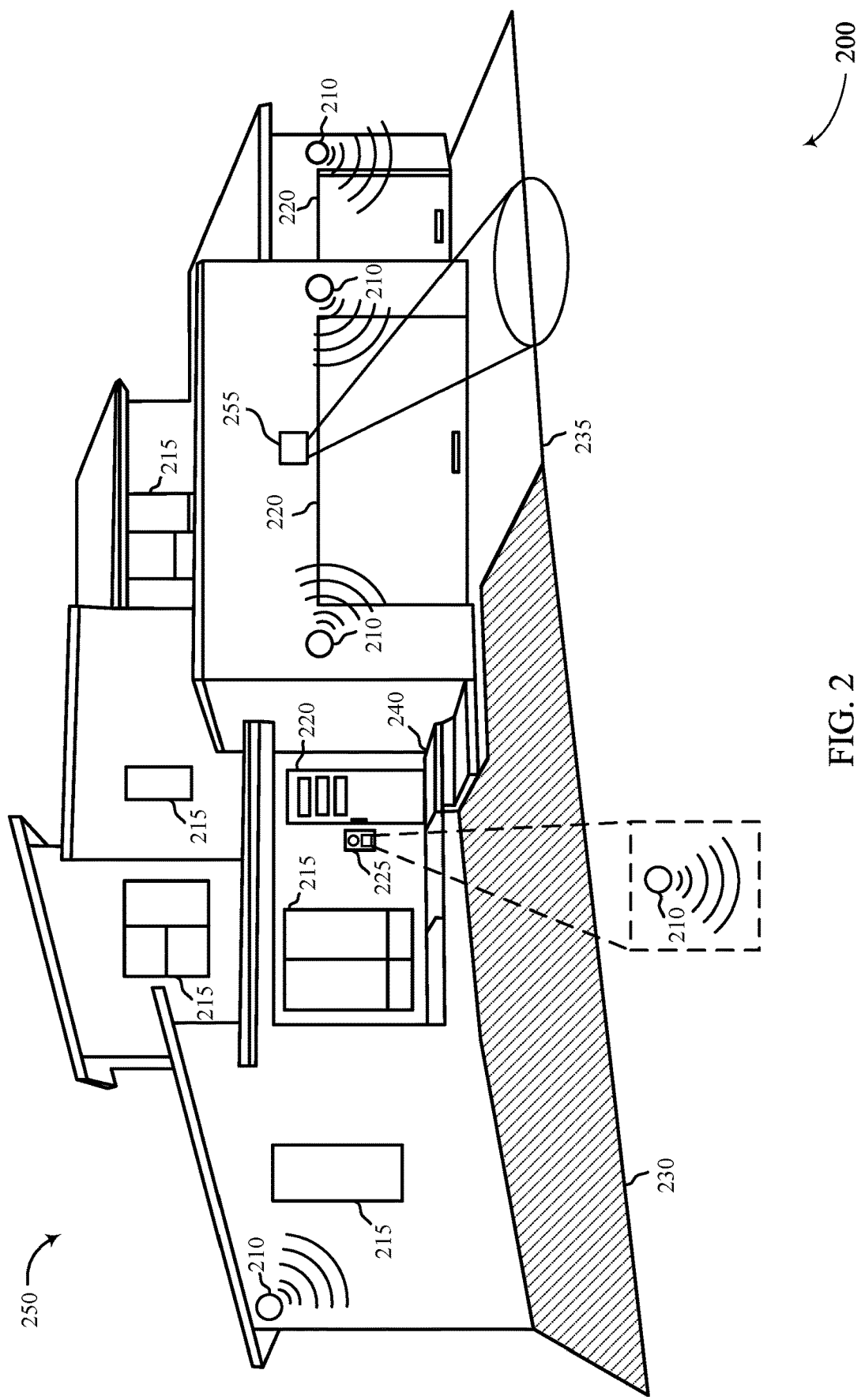
FIG. 2 illustrates an example of a security and automation environment that supports a smart monitoring system in accordance with aspects of the present disclosure.

FIG. 2 illustrates an example of a security and automation environment 200 that supports a smart monitoring system in accordance with aspects of the present disclosure. In some examples, security and automation environment 200 may implement aspects of the system 100. The security and automation environment 200 may include one or more sensor units 210 and one or more access points 215 and one or more access points 220. For example, the access points 215 may include windows of a home 250, and the access points 220 may include doors (e.g., an entrance door, a garage door, etc.) to a home 250. In some examples, the home 250 may include a porch 240.

One or more sensor units 210 may include one or more examples of sensor units 110 as described in FIG. 1. The one or more sensor units 210 may be installed, mounted, or integrated with one or more of the access points 215 and the access points 220, or alternatively with an interior and/or an exterior surface of the home 250. In some examples, one or more sensor units 210 may be installed, mounted, or integrated with a doorbell 225. The one or more sensor units 210 may monitor an exterior or an interior of the home 250. In some examples, the one or more sensor units 210 may monitor a yard 230 and/or a driveway 235 adjacent to the home 250.

The home 250 may include one or more zones. In one example, a zone of the home 250 may be a bedroom, living room, etc., of the home 250. The zone may also include a floor and a ceiling. In some examples, the zone may include one or more sensors units 210 (not shown) or devices installed, mounted, or integrated with the zone 205. For example, the zone may have a motion sensor (such as sensor unit 210) installed or mounted on a wall of the zone. The motion sensor may detect whether the zone is occupied and report collected sensor data to a control panel. In some examples, the zone may include an access point 215 and an access point 220. The access point 220 may include a door or be an open entry. Additionally or alternatively, the access point 215 may include a window. In some examples, the zone may include a lock component. For instance, the access point 220 may include a lock component, while the access point 215 may be absent of a lock component, e.g., when the access point 220 is an open entry-way.

The home 250 may include a security and automation system (e.g., the system 100). Although not depicted herein, the home 250 may include a control panel, which may be one or more examples of a control panel 135 as described in FIG. 1. The control panel may be a smart home system panel, for example, an interactive panel mounted on a wall of the security and automation environment 200. In some examples, the control panel may be in direct communication via wired or wireless communication links with one or more sensor units 210, may receive sensor data from the one or more sensor units 210. In some examples, the control panel 135 may communicate and receive data periodically or continuously from the sensor units 210. The control panel and the one or more sensor units 210 may communicate according to a radio access technology (RAT) such as 5G New Radio (NR) RAT, Long Term Evolution (LTE), IEEE 802.11 (Wi-Fi), IEEE 802.16 (WiMAX), near-field communication (NFC), ZigBee protocol, among others.

The security and automation system may include a device 255. In some examples, the device 255 may be a camera-enabled device as described herein. For example, the device 255 may be an example of aspects of a sensor unit 210 including a camera, the device 255 may be an example of a lighting and/or sound device in electronic communication with a sensor unit 210 and/or the security and automation system (e.g., a control panel of the home 250), or any combination thereof.

According to the techniques described herein, the security and automation system implemented at the home 250 may be configured to monitor a physical environment (e.g., an interior of the home 250, an exterior of the home 250 such as the driveway 235 and/or the porch 240, etc.). For example, the security and automation system may monitor the physical environment using the device 255 and/or one or more sensor units 210. The security and automation system may detect a trigger in the physical environment based on the monitoring, for example using the device 255, a motion sensor, or another sensor unit 110. The trigger may be a detected object, person, event, or any combination thereof. The security and automation system may perform one or more actions based on the detected trigger.

For example, the security and automation system may select a direction of a plurality of directions to emit light via a light emitting source (e.g., the device 255). In such examples, the security and automation system may activate the light emitting source and emit the light in the direction based on the activating and the detected trigger. In some examples, the security and automation system may adjust one or more settings of the light emitting source (e.g., the light may be adjusted to emit light in a strobe-like manner, the light may use a spotlight to track and/or guide a detected intruder, the light may be emitted in a plurality of directions to provide a floodlight upon detection that the individual is known to the system, the light may be adjusted to move in a pattern, among other examples). Additionally or alternatively, the security and automation system may emit sound based at least in part on the detected trigger (e.g., to inform an intruder they are being watched and/or identified, playing an alarm or siren sound, among other examples). The techniques described herein may deter an intruder from an intended action (e.g., theft, property damage, etc.) and/or provide lighting to a user of the security and automation system, among other benefits.

The security and automation system may implement one or more smart monitoring techniques as described herein. For example, the system may monitor the physical environment of the home 250. The system (e.g., a control panel of the home 250 or other devices) may be configured to receive a set of inputs from one or more sensor units 210. The one or more sensor units 210 may be examples of sensor units 110 as described with reference to FIG. 1. The sensor units 210 may transmit data to the system (e.g., the control panel or another device), such as light data, video data, image data, audio data, motion data, and the like. Additionally or alternatively, the smart home 250 may be in a smart neighborhood and may receive communications from other smart homes 250 in the neighborhood. Additionally or alternatively, a user may provide an input to the control panel or another device.

The system may process the set of inputs. For example, the system may process data to identify one or more parameters (e.g., characteristics of an entity, settings of the system, and the like). The parameters may be associated with one or more entities, such as an individual, animal, event, object, or any combination thereof (e.g., the system may identify an individual as a possible criminal or as a user of the home 250). For instance, the system may analyze video data, image data, sound data, motion data, or any combination thereof. As an illustrative example, the system may analyze a gait of a person (e.g., a video of a person walking may be analyzed to determine whether the movement of the person indicates caution or sneaking behavior). Additionally or alternatively, the system may analyze a behavior of the person (e.g., identify behaviors that indicate caution or otherwise suspicious behaviors such as checking over their shoulders, a frequency of walking past an object or area, etc.). Additionally or alternatively, the system may analyze a characteristic of a person (e.g., the system may identify that the individual is wearing a mask, carrying a crowbar or weapon, etc.). In some examples, the system may identify an identity of the person proximate the smart home 250. For example, the system may use biometric information, facial recognition, AI learning (e.g., gait analysis), an identification device carried by the individual, or any combination thereof to determine the identity of the person.

In some examples, the system may input the data to an AI algorithm, which may enable the system to analyze various situations and provide different outputs based on the inputs. In other words, AI filtering may be used to identify one or more events, people, scenarios, activities, and so on. The AI may additionally or alternatively select one or more outputs based on AI processing. As an illustrative example, the AI component may learn which outputs or actions result in successful outcomes (e.g., deterrence of a criminal, guiding of a user to a door using directional light or sound, etc.) based on a set of inputs, and the AI component may implement the successful outputs for a respective set of inputs in future situations (e.g., an AI component may use variable sounds for different people or events based on learning which outputs are successful from historical attempts and sound outputs, among other examples of AI learning and outputs). As another illustrative example, the AI filtering may choose which events, people, scenarios, activities, and the like are forwarded or otherwise notified to a human guard or the user of the smart home 250.

Accordingly, the system may determine one or more parameters based on monitoring the premises. As an illustrative example, the system may input the one or more inputs to a machine learning module and output one or more outputs indicating a classification of the one or more inputs, a localization of the one or more inputs, or both, among other examples of outputs. Such processing may enable the system to determine the one or more parameters and intelligently perform an action based on the one or more parameters. For example, the system may determine an identity of one or more entities (e.g., a person, an object, an animal, an event, and the like), a behavior of an entity, a setting of the security and automation system, or any combination thereof based on processing the inputs from the components of the system.

The system may perform one or more operations in accordance with the one or more parameters. For example, the system may perform a first action for a first identity of a person or a second action for a second identity of a person (e.g., the system may be configured to perform the first action for known individuals and the second action for unknown individuals). Additionally or alternatively, the system may identify a setting indicating an action to perform for a determined classification or localization of the event or entity and the system may perform the action. In some examples, the system may perform an action targeted at an entity. For example, the system may perform an operation directed to a person detected by the system (e.g., the system may announce "welcome home, Dave" and light a path between the person and an entrance to the home, or the system may announce "please leave the premises, Dave" to deter an individual from the property, among other examples).

In some examples, the system may perform one or more operations, which may affect a detected behavior of an entity. For example, the system may emit a light, emit a sound, spray water, release a drone, emit one or more lasers, project an image, send a message, record an event (e.g., capture image or video data), activate one or more lighting sources, or any combination thereof. In some examples, such operations may be targeted towards an entity (e.g., projecting a light, laser, water, image, or sound to deter a person from performing a predicted event, lighting a pathway from the driveway to the door if the identity of the person indicates a user of the system, etc.), which may influence behavior of the entity (e.g., guide a person off or towards the property), enhance a user experience, or both.

In some examples, the system may perform an operation to project a presence. For example, the system may simulate a presence within the home 250 (e.g., lights inside or outside the home may be turned on, the device 255 or another light may sweep a light back and forth and then hone in on an intruder to emulate a person sweeping a flashlight, audio of a dog barking, people shouting, laughter, and the like may be emitted internal or external to the premises, among other examples).

Additionally or alternatively,

The intelligent devices of the home 250 may be configured to dynamically respond to various inputs. For example, the system may perform an operation based on a classification or localization of an entity or event (e.g., the AI component may output or otherwise indicate a classification or localization of an event based on the one or more inputs). As an illustrative example, the system may detect a person relatively distant from the home 250 or an object of interest (e.g., relatively far from a door or car of the home 250). The system may classify such a localization as relatively low risk. The system may perform a corresponding action based on the classification. For example, the system may light the premises using a first setting (e.g., a floodlight on the car or lights within or outside the home turned on). The system may detect at a second time that the person is relatively closer to the home 250 or the object. In such examples, the system may classify the localization as relatively high risk. The system may perform a second action based on the classification (e.g., the system may initiate a strobe of the light using one or more various colors, begin a whistle sound, increase a wattage of the light, turn on sirens, send a drone to follow the person, etc.). Accordingly, the system may be enabled to evaluate a severity of a threat (e.g., classify the threat into one of multiple categories) and select an appropriate response based on the classification of the threat. Additionally or alternatively, the system may cease performing an operation if one or more thresholds are satisfied (e.g., the system may lower an intensity of an operation or cease performing the operation if a person begins to leave the property). By increasing or decreasing an intensity of the one or more operations based on analyzing the inputs, the system may be able to successfully deter an individual from perpetrating a crime while reducing the probability of taking severe actions for a relatively low risk event or entity.

In some examples, the system may operate in one or more modes as described herein. For example, the system may operate in a first mode during a first temporal period. The system may perform one or more operations based on operating in the first mode. For example, the first mode may be an example of a relatively low security mode. The system may implement relatively less aggressive actions based on operating in the first mode (e.g., the system may light a pathway for one or more people or send a notification of a detected event to a user). Additionally or alternatively, the system may operate in a second mode during the first temporal period or a second temporal period. For example, the second mode may be an example of a relatively high security mode. In such examples, the system may implement relatively more aggressive actions based on operating in the second mode (e.g., the system may perform deterrence actions such as flashing or strobing a light, spraying water, emitting lasers at an entity, or other targeted actions). In some examples, the system may select a mode for operation based on one or more settings of the security system, a time of day, an analysis of the one or more inputs, or any combination thereof.

In some examples, the system may initially perform a first operation and analyze the behavior of an entity (e.g., the system may detect a person approaching a car and determine that the person may intend to break into the car, and the system may initiate the first operation based on the detection). If the behavior of the entity is unaffected by the first operation (e.g., shining a light on the entity and/or the car), the system may perform a second operation (e.g., the system may begin strobing or flashing the light, emitting water or sounds or lasers, sending a drone after the entity, etc.). In some cases, the system may switch from the first mode to the second mode and perform the second operation based on switching modes.

In some examples, the system may perform an operation based on machine learning. For example, the system may analyze a result of an operation. The system may configure settings automatically based on analyzing the results of operations. For example, the system may determine that an operation was relatively successful (e.g., a possible criminal was deterred using a first sound or light or other action), and may adjust a setting of the system to implement the successful operation (e.g., the system may refrain from performing operations that have been historically unsuccessful). As one illustrative example, if a first emitted sound or light (or another operation) fails to deter an entity or guide an entity to a reference location, the system may adjust a setting to emit a second sound or light (or other operation) upon detecting a similar or identical set of inputs, although any operation may be implemented (e.g., lights, water, drones, etc.). Accordingly, the system may be configured to learn from behaviors and logging activities of users or entities over time.

Figure 3:
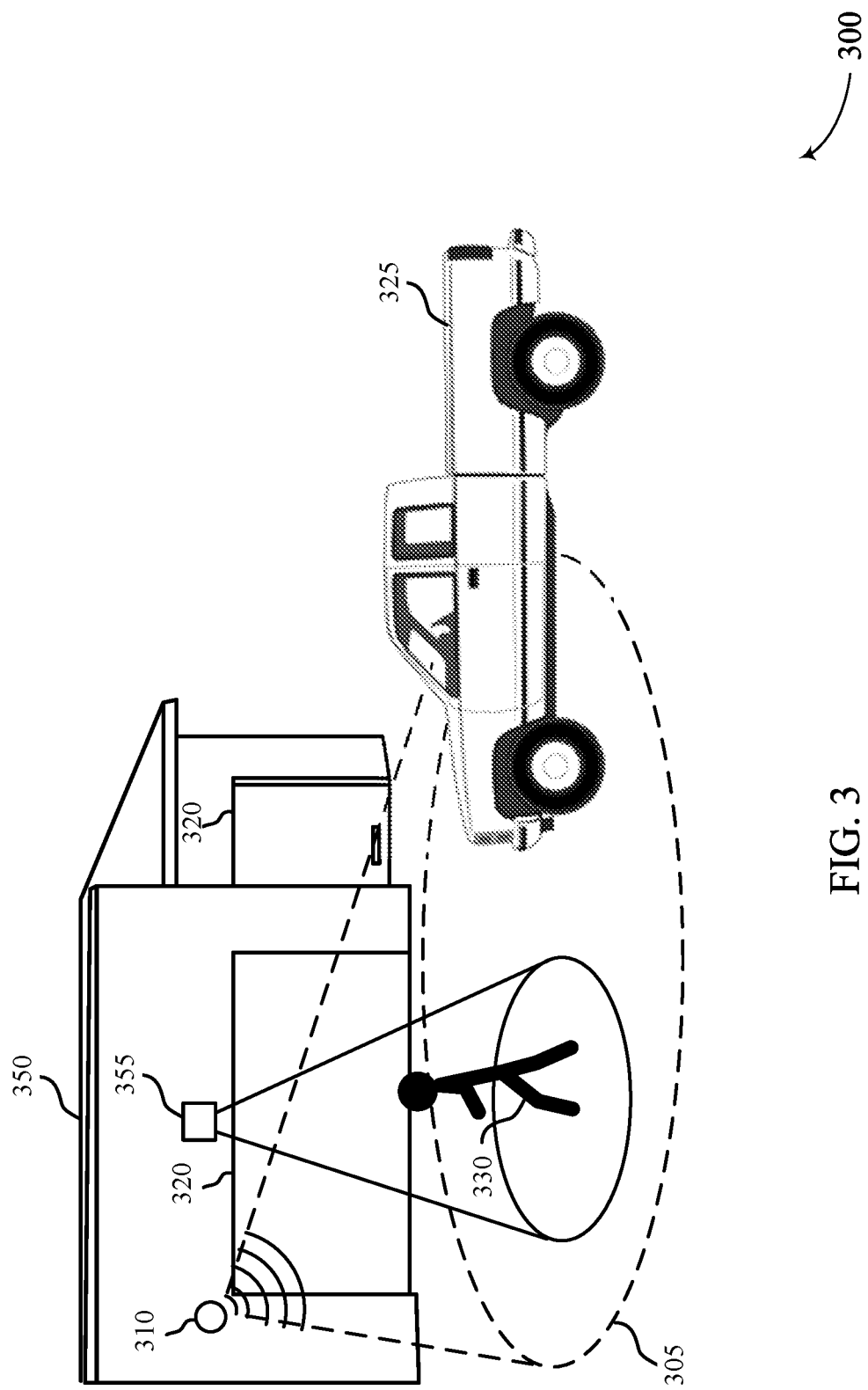
FIG. 3 illustrates an example of a security and automation environment that supports a smart monitoring system in accordance with aspects of the present disclosure.

FIG. 3 illustrates an example of a security and automation environment 300 that supports a smart monitoring system in accordance with aspects of the present disclosure. In some examples, security and automation environment 300 may implement aspects of the system 100 or the security and automation environment 200. As an example, the security and automation environment 300 may include a device 355 and/or a sensor unit 310 and one or more access points 320, which may be examples of the corresponding devices (e.g., the device 255) and points as described with reference to FIGS. 1 and 2.

The access points 320 may include doors (e.g., an entrance door, a garage door, etc.) of a building 350 (e.g., a home, a commercial business, etc.). The device 355 and/or the sensor unit 310 may be installed, mounted, or integrated with one or more of the access points 320, or alternatively with an exterior (or interior) surface of the building 350. The device 355 may be an example of a camera-enabled device. For example, the device 355 may include or be an example of a light emission component (e.g., the device 355 may include one or more light emitting diodes (LEDs)), a sound emission component, a sensor unit 310 (e.g., a camera component), or any combination thereof. In some examples, the device 355 may be a standalone device (e.g., the device 355 may be an example of a single device configured to perform the operations described herein, such as a smart outdoor camera). In such examples, the operations performed by the security and automation system may be performed by the device 355. In some examples, the device 355 may be integrated into a security and automation system.

The device 355 may include multiple devices in electronic communication with the system or each other. As an illustrative example, the device 355 may include one or more light or sound emission devices, and a control panel may transmit commands or instructions to operate the device 355 based on information such as sensor data received from the sensor unit 310 or other inputs. In some examples, the device 355 (or the sensor unit 310) may monitor a physical environment, such as an exterior or interior of the building 350. For example, the device 355 may monitor a driveway adjacent to the building 350 (or building 350) using a camera, a motion sensor, an infrared sensor, among other examples of sensors. In some examples, monitoring the physical environment may include receiving one or more inputs (e.g., video inputs, thermal imagery, sound inputs for acoustic analysis, etc.) from distributed devices covering one or more zones 305 (e.g., including the sensor unit 310), the device 355 (e.g., if the control panel or another device is receiving the inputs), one or more motion sensors, one or more cameras, one or more radio frequency radars, one or more infrared sensors, one or more audio sensors, or any combination thereof.

The device 355 may detect a trigger in the physical environment (e.g., in a geo-boundary associated with a premise such as the zone 305) based on the monitoring. For example, the device 355 may detect one or more people 330 (e.g., the person 330) in the physical environment, an object (e.g., an animal, the vehicle 325, etc.), an event (e.g., weather events, audio events, gunshot detection, vehicle damage detection such as glass breaking or slamming doors, siren detection, alarm detection, among other examples of events), or any combination thereof, among other examples of triggers. In some examples, triggering events may be detected based on a presence or absence, arrival or departure, detected behavior, etc., of one or more targets of interest within the monitored space. Such targets of interest may be automatically identified by the device 355, configured at the device 355 (e.g., via user input), or a combination thereof.

In some examples, the device 355 may detect a presence of a person 330. The device 355 may determine an identity of the person 330 (e.g., the device 355 may perform an identification operation). For example, the device 355 may be configured to determine the identity of the person 330 based on one or identification factors or techniques (e.g., facial recognition algorithms, license-plate recognition, biometric information, one or more static physical characteristics, time sequenced information such as gait analysis, voice recognition, RFID verification, among other example of identity recognition information or techniques). In some examples, the device 355 may determine, based on using the one or more identification factors, that the identity of the person matches a profile of an occupant of the smart-home. Alternatively, the device 355 may determine, based on using the one or more identification factors, that the identity of the person does not match a profile of an occupant of the smart-home. In other words, the person may be unknown to the device 355 (e.g., unknown to the security and automation system) and may be a potential threat (e.g., an intruder intending to commit a crime).

The device 355 may perform one or more actions based on the detected trigger, the determined identity, one or more operation modes, or any combination thereof. For example, the device 355 may be configured to operate in various modes. The device 355 may be configured to operate in a first mode (also referred to as a security mode or an armed state) during pre-configured hours of a day, based on an input from an occupant of the building 350, among other examples. The device 355 may determine actions to perform upon detection of a trigger depending on a current operation mode of the device 355, an identity of a detected person, a categorization of the event, object, or person, or any combination thereof. As an illustrative example, the device 355 may emit a light or a sound, begin recording video or taking images, notify a user or authorities, or a combination thereof based on detecting a trigger.

In some examples, the device 355 may activate a light emitting source based on the detection of a trigger (e.g., a detected event, a detected object, a detection of the person 330 and/or classifications related to the person 330 such as an unknown classification or a known classification, etc.). The device 355 may select one or more directions of a plurality of directions to emit light via a light emitting source (e.g., the device 355 may include one or more light emitting components configurable to emit light at different directions and/or angles). In such examples, the device 355 may activate a light emitting source to emit the light in the selected direction based on the activating and the detected trigger. In some examples, the emission of the light may function as a warning mode (e.g., to an unknown person to leave the premises). Additionally or alternatively, the emission of the light may have a characteristic of a floodlight to illuminate an area (e.g., a driveway of the physical environment) for a known person of the device 355. For example, one or more targets of interest may be illuminated (e.g., the light may be directed to the vehicle 325 upon detection of a shattered window, among other examples of directing the light to a person, object, or event).

In some examples, the device 355 may adjust one or more settings (e.g., parameters of the light emitting source). For example, the light emitting source may be configured to emit a visible light towards a location of the person 330 (e.g., a spotlight on the person 330) within the zone 305 (e.g., the driveway). In some examples, the direction of the emitted light may be towards an expected (e.g., predicted) locations of the person 330, the light may guide the person 330 to a desired location, the light may follow a movement of the person 330 (e.g., the light may continuously track the person 330), the light emitting source may illuminate a first location of the person 330 at a first time, identify a second location of the person 330 at a second time, and illuminate the second location of the person 330, etc. In some examples, the light emitting source may be configured to emit a visible light with a "strobe" effect (e.g., flashing on and off repeatedly). For example, the light emitting source may be configured to emit a visible light according to a periodicity. In other examples, the light emitting source may be configured to emit a visible light according to a motion profile. For example, the light emitting source may be configured to move in a sweeping pattern (e.g., sweep back and forth). The sweeping pattern may relate to an angular orientation of the light emitting source. In some examples, adjusting the one or more settings may include adjusting parameters such as a direction and/or an orientation of the light emitting source, a location of the source emitting the light (e.g., several light emitting sources may be implemented with the one or more parameters described herein), a shape of the visible light (e.g., a narrow beam shape or a wide beam shape), a color temperature of the light, a wavelength of the light (e.g., infrared light, visible light), an intensity, a periodicity, a temporal pattern, a spatial pattern, a duty cycle, a synchronization with a camera shutter speed of the camera-enabled device, among other examples of parameters.

In some examples, the device 355 may adjust one or more settings upon detecting one or more additional triggers. For example, the device 355 may emit a spotlight on a detected individual at a first time in accordance with a first configuration. The device 355 may detect a group of people 330 at a second time and identify a second configuration (e.g., a second set of settings). The device 355 may operate in accordance with the second configuration based on the detection of the group of people 330 (e.g., the device 355 may switch from emitting a spotlight to emitting a floodlight, among other examples of adjusting parameters).

Additionally or alternatively, the device 355 may activate a sound emitting source to emit sound based at least in part on the detected trigger (e.g., audible sound, ultrasonic sound, infrasonic sound, etc.). Such a sound emission component may deter an intruder, indicate that the person 330 is being identified or has been identified, alert one or more people (e.g., the person 330, users of the system) to an event trigger, sound an alarm, or any combination thereof. The device 355 may emit the sound in accordance with one or more settings. For example, the device 355 may be configured with different settings for different triggers and/or operations modes. As an illustrative example, the device 355 may be configured to emit an alarm for a detected crime or a detection of the person 330 at pre-configured hours, play a warning message to an unknown person 330 or play a welcome message to a known person 330, adjust one or more parameters upon detection of one or more triggers, etc.

In some examples, the device 355 may emit the sound and/or light based on a threshold. For example, the device 355 may determine that a person 330 has remained within the zone 305 for a duration that satisfies a threshold (e.g., the person 330 has remained on a premises for a time period longer than a duration of a timer initiated upon detection of the person 330). The device 355 may modify one or more parameters based on the satisfied threshold. For instance, the device 355 may enable a strobe effect of the light, a motion of the visible light (e.g., sweeping back and forth), play a warning message or alarm sound, or a combination thereof. In some examples, the device 355 may deactivate (e.g., turn off) the light emitting source and/or the sound emitting source based on detecting that the person has left the zone 305 prior to an expiration of a timer. Thus, the techniques described herein may improve a likelihood that a security and automation system may prevent theft of or damage to property in the security and automation environment 300 and provide sufficient lighting for a known user of the security and automation environment 300, among other benefits.

Figure 4:
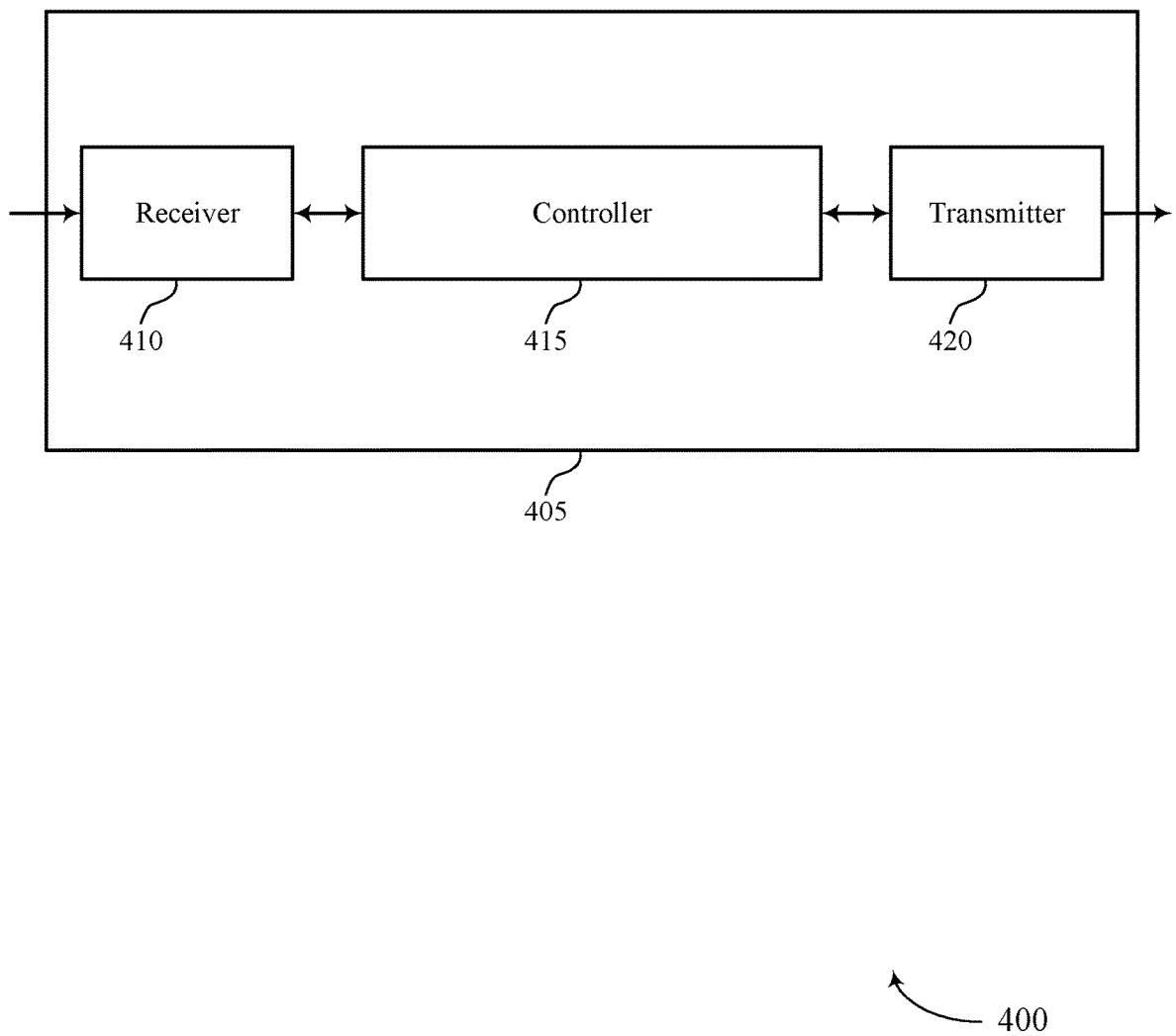
FIGS. 4 and 5 show block diagrams of devices that support a smart monitoring system in accordance with aspects of the present disclosure.

FIG. 4 shows a block diagram 400 of a device 405 that supports a smart monitoring system in accordance with aspects of the present disclosure. The device 405 may be an example of aspects of a device 255, a device 355, control panel 135, a local computing device 120, a server 155, or a remote computing device 140 as described herein. The device 405 may include a receiver 410, a controller 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to a smart monitoring system, etc.). Information may be passed on to other components of the device 405. The receiver 410 may be an example of aspects of the transceiver 720 described with reference to FIG. 7. The receiver 410 may utilize a single antenna or a set of antennas.

The controller 415 may monitor a physical environment using a camera-enabled device, detect a trigger in the physical environment based on the monitoring, where the trigger includes an object, a person, an event, or any combination thereof, select, based on the detecting, a direction of a set of directions to emit light via a light emitting source, activate the light emitting source based on the selecting, and emit, via the light emitting source, the light in the direction based on the activating and the detected trigger. The controller 415 may be an example of aspects of the controller 710 described herein.

In some examples, the controller 415 may monitor a physical environment using a camera-enabled device operating in a first mode of a set of modes. The controller 415 may determine one or more parameters based on the monitoring, the one or more parameters including an identity of an entity, a behavior of the entity, or a setting of the security and automation system, or any combination thereof. The controller 415 may perform an operation using the security and automation system based on the one or more parameters The controller 415, or its sub-components, may be implemented in hardware, code (e.g., software or firmware) executed by a processor, or any combination thereof. If implemented in code executed by a processor, the functions of the controller 415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The controller 415, or its sub-components, may be physically located at various positions, including being distributed such that portions of functions are implemented at different physical locations by one or more physical components. In some examples, the controller 415, or its sub-components, may be a separate and distinct component in accordance with various aspects of the present disclosure. In some examples, the controller 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
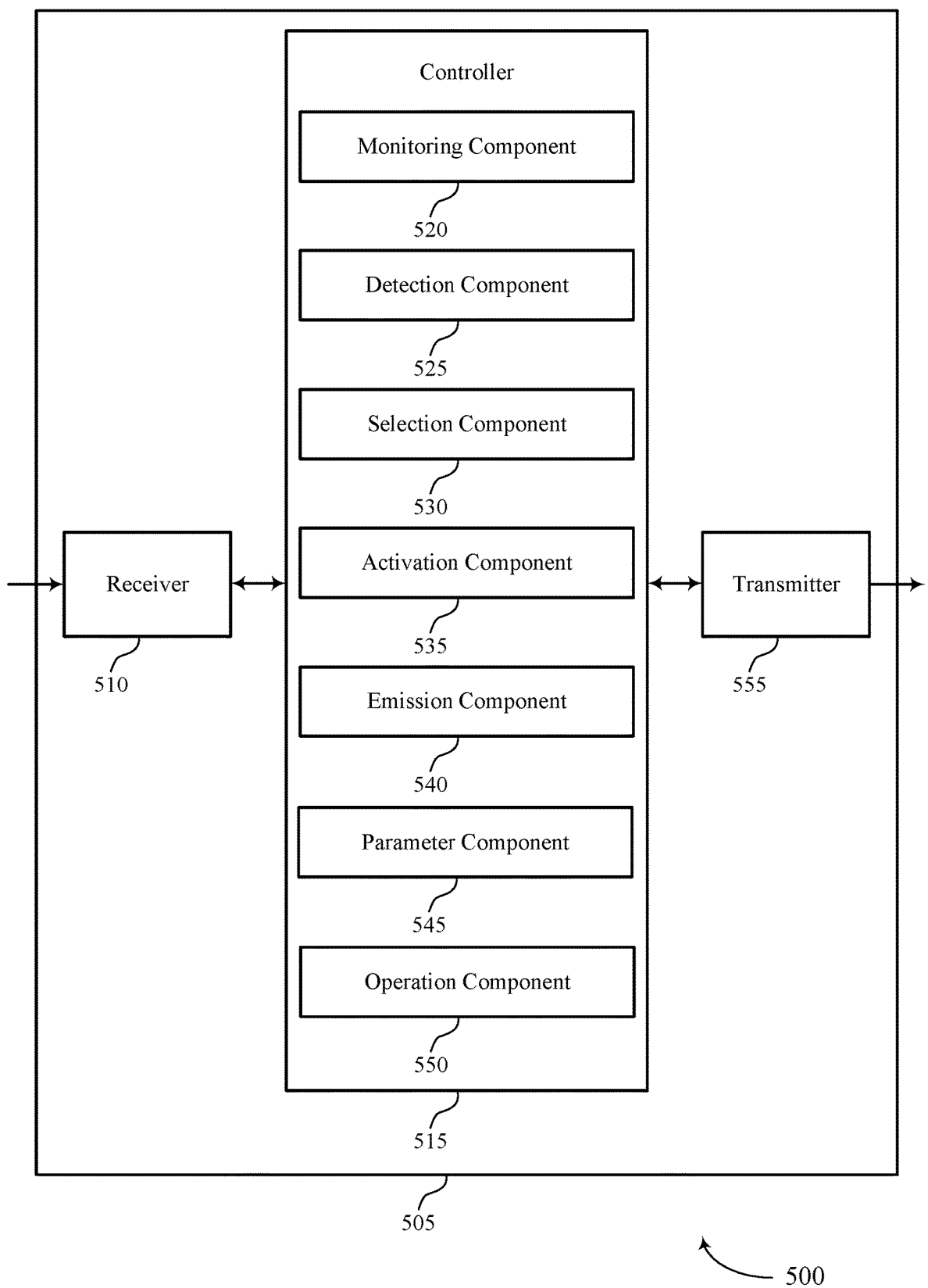

FIG. 5 shows a block diagram 500 of a device 505 that supports a smart monitoring system in accordance with aspects of the present disclosure. The device 505 may be an example of aspects of a device 255, a device 355, a device 405, a control panel 135, a local computing device 120, a server 155, or a remote computing device 140 as described herein. The device 505 may include a receiver 510, a controller 515, and a transmitter 555. The device 505 may also include a processor. Each of these components may be in communication with one another (e.g., via one or more buses).

The receiver 510 may receive information such as packets, user data, or control information associated with various information channels (e.g., control channels, data channels, and information related to a smart monitoring system, etc.). Information may be passed on to other components of the device 505. The receiver 510 may be an example of aspects of the transceiver 720 described with reference to FIG. 7. The receiver 510 may utilize a single antenna or a set of antennas.

The controller 515 may be an example of aspects of the controller 415 as described herein. The controller 515 may include a monitoring component 520, a detection component 525, a selection component 530, an activation component 535, an emission component 540, a parameter component 545, and an operation component 550. The controller 515 may be an example of aspects of the controller 710 described herein. The activation component 535 may activate the light emitting source based on the selecting. The monitoring component 520 may monitor a physical environment using a camera-enabled device. The emission component 540 may emit, via the light emitting source, the light in the direction based on the activating and the detected trigger. The selection component 530 may select, based on the detecting, a direction of a set of directions to emit light via a light emitting source. The detection component 525 may detect a trigger in the physical environment based on the monitoring, where the trigger includes an object, a person, an event, or any combination thereof. In some examples, the monitoring component 520 may monitor a physical environment using a camera-enabled device operating in a first mode of a set of modes. The parameter component 545 may determine one or more parameters based on the monitoring, the one or more parameters including an identity of an entity, a behavior of the entity, or a setting of the security and automation system, or any combination thereof. The operation component 550 may perform an operation using the security and automation system based on the one or more parameters.

The transmitter 555 may transmit signals generated by other components of the device 505. In some examples, the transmitter 555 may be collocated with a receiver 510 in a transceiver module. For example, the transmitter 555 may be an example of aspects of the transceiver 720 described with reference to FIG. 7. The transmitter 555 may utilize a single antenna or a set of antennas.

Figure 6:
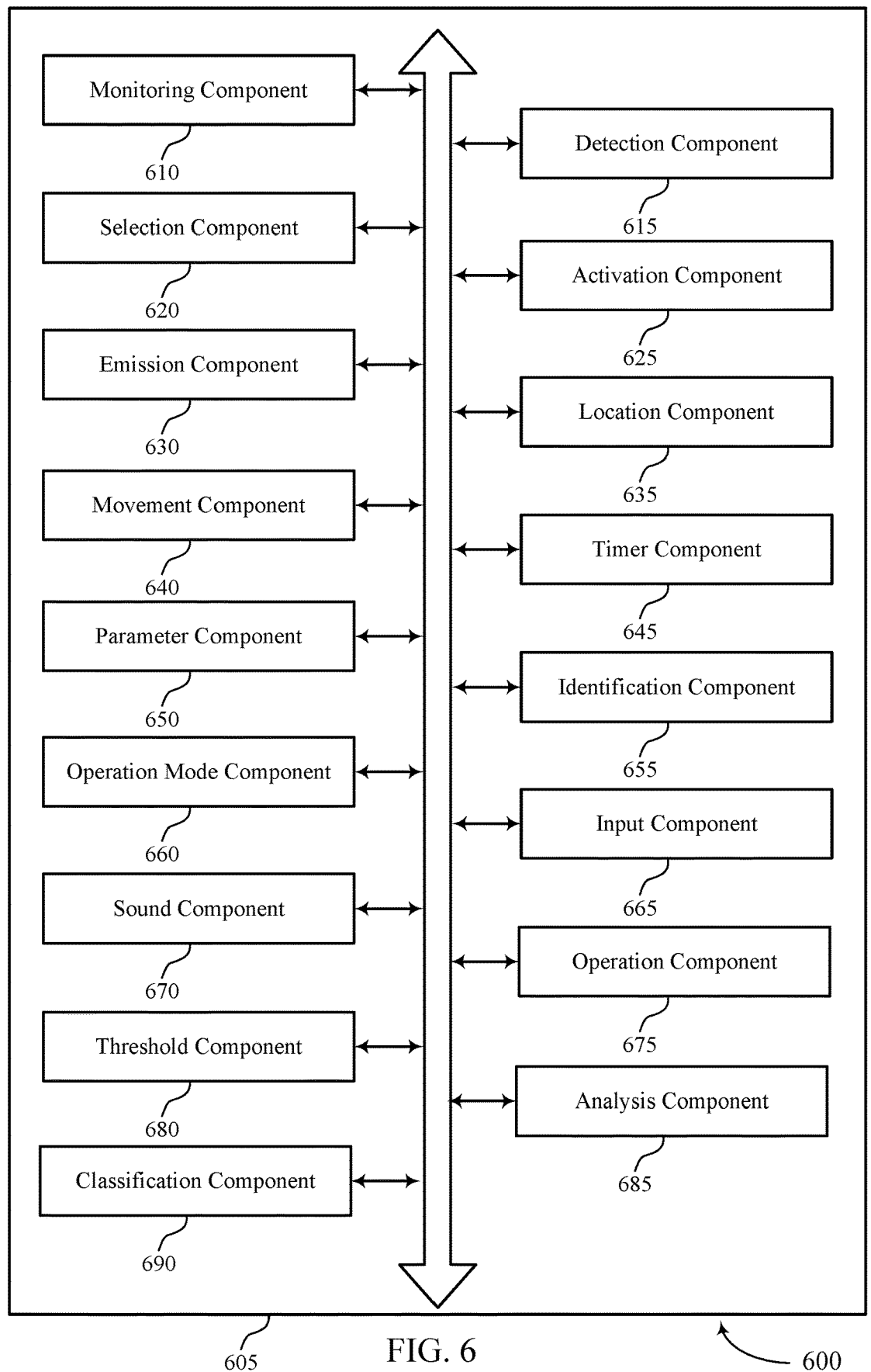
FIG. 6 shows a block diagram of a controller that supports a smart monitoring system in accordance with aspects of the present disclosure.

FIG. 6 shows a block diagram 600 of a controller 605 that supports smart monitoring system in accordance with aspects of the present disclosure. The controller 605 may be an example of aspects of a controller 515, or a controller 710 described herein. The controller 605 may include a monitoring component 610, a detection component 615, a selection component 620, an activation component 625, an emission component 630, a location component 635, a movement component 640, a timer component 645, a parameter component 650, an identification component 655, an operation mode component 660, an input component 665, a sound component 670, an operation component 675, a threshold component 680, an analysis component 685, and a classification component 690. Each of these modules may communicate, directly or indirectly, with one another (e.g., via one or more buses).

The monitoring component 610 may monitor a physical environment using a camera-enabled device. In some examples, the monitoring component 610 may determine an absence of the person in the physical environment before the expiration of a timer. In some examples, the monitoring component 610 may determine that the person remains in the physical environment after the expiration of the timer. The detection component 615 may detect a trigger in the physical environment based on the monitoring, where the trigger includes an object, a person, an event, or any combination thereof. In some cases, the event includes an arrival, a departure, a presence, an absence, a behavior, a weather event, an audio event, a security event, or any combination thereof. In some examples, the detection component 615 may capture an image or a video of the person using the camera-enabled device. In some examples, the detection component 615 may detect a set of individuals in the physical environment.

The selection component 620 may select, based on the detecting, a direction of a set of directions to emit light via a light emitting source. In some examples, the selection component 620 may select, based on the tracking, a second direction of the set of directions to emit the light via the light emitting source. In some examples, the emission component 630 may emit, via the light emitting source, the light in the second direction based on the selecting. The activation component 625 may activate the light emitting source based on the selecting. In some examples, the activation component 625 may deactivate the light emitting source based on the expiration of the timer and the absence of the person in the physical environment.

The emission component 630 may emit, via the light emitting source, the light in the direction based on the activating and the detected trigger. In some examples, emitting, via the light emitting source, the light in the direction is based on a strobe pattern. In some examples, the emission component 630 may refrain from emitting the light in the direction for a time period in accordance with a periodicity. In some examples, the emission component 630 may emit, via the light emitting source, the light in the direction for a second time period in accordance with the periodicity. In some examples, emitting, via the light emitting source, the light in the direction is based on a sweep pattern. In some examples, the emission component 630 may emit, via the light emitting source, the light in each of the set of directions based on a person being a known user associated with the monitoring system. In some examples, the emission component 630 may emit, via the light emitting source, the light in a directional manner, a strobe pattern, or a sweep pattern based on an unknown person associated with the monitoring system. In some examples, the emission component 630 may emit the light in a first configuration based on detecting a first individual in the physical environment. In some examples, the emission component 630 may emit the light in accordance with a second configuration based on detecting the set of individuals in the physical environment. In some cases, the light includes visible light, infrared light, or a combination thereof.

The location component 635 may determine a location of the person in the physical environment based on information from the camera-enabled device. In some examples, selecting (e.g., by the selection component 620) the direction of the set of directions to emit the light via the light emitting source is based on the location of the person in the physical environment. In some examples, the location component 635 may determine an expected location of the person in the physical environment based on one or more characteristics of the person. In some examples, selecting the direction of the set of directions to emit the light via the light emitting source is based on the expected location of the person in the physical environment. In some examples, the location component 635 may determine an expected location of the person in the physical environment, where selecting the direction and activating the sound emitting source is based on the expected location of the person in the physical environment. In some cases, the direction includes a direction towards the location of the person in the physical environment.

The movement component 640 may track a movement of the person in the physical environment from the location to a second location using the camera-enabled device. The timer component 645 may initiate a timer based on detecting the person in the physical environment. In some examples, the timer component 645 may determine an expiration of the timer. The parameter component 650 may adjust a parameter of the light emitting source based on the expiration of the timer and the person remaining in the physical environment. In some examples, the parameter component 650 may initiate a strobe pattern of the light emitting source, the strobe pattern corresponding to a periodicity of emitting the light. In some examples, the parameter component 650 may initiate a sweep pattern of the light emitting source, the sweep pattern corresponding to a motion of emitting the light. In some examples, the parameter component 650 may adjust a parameter of the sound emitting source based on the expiration of the timer and the person remaining in the physical environment. In some examples, the parameter component 650 may adjust one or more parameters of the light emitting source based on detecting the trigger, where the one or more parameters of the light emitting source include a location, a shape, a wavelength, a color temperature, an intensity, a periodicity, a temporal pattern, a spatial pattern, a duty cycle, a synchronization with a camera shutter speed, or any combination thereof.

The identification component 655 may identify, using the camera-enabled device, the person in the physical environment based on detecting the person. In some examples, the identification component 655 may perform an identification operation based on the captured image or video, where the identification operation includes a facial recognition, a license plate recognition, a time sequenced analysis, or any combination thereof. In some examples, the identification component 655 may determine, based on the identifying, that the person is a known user associated with the monitoring system, where emitting the light includes.

The operation mode component 660 may operate the camera-enabled device in a mode based on a configuration of the camera-enabled device or an input from a user of the monitoring system, or both. The input component 665 may receive one or more inputs from one or more devices associated with the monitoring system, where monitoring the physical environment is based on the one or more inputs. The sound component 670 may select, based on the detecting, a direction of a set of directions to emit sound via a sound emitting source. In some examples, the sound component 670 may activate the sound emitting source based on the selecting. In some examples, emitting, via the sound emitting source, the sound in the direction is based on the activating, where the sound includes an audible frequency, an ultrasonic frequency, an infrasonic frequency, or any combination thereof.

The monitoring component 610 may monitor a physical environment using a camera-enabled device operating in a first mode of a set of modes. The parameter component 650 may determine one or more parameters based on the monitoring, the one or more parameters comprising an identity of an entity, a behavior of the entity, or a setting of the security and automation system, or any combination thereof. The operation component 675 may perform an operation using the security and automation system based on the one or more parameters. In some examples, the threshold component 680 may determine that the one or more parameters satisfy one or more thresholds during a first temporal period. In some examples, the operation mode component 660 may switch from the first mode to a second mode of the set of modes based on the one or more parameters satisfying the one or more thresholds during the first temporal period, where performing the operation is based on the camera-enabled device operating in the second mode. In some examples, the threshold component 680 may determine, during a second temporal period, that the one or more parameters fail to satisfy the one or more thresholds. In some examples, the operation mode component 660 may switch from the second mode to the first mode during the second temporal period based on the one or more parameters failing to satisfy the one or more thresholds.

The input component 665 may receiving one or more inputs from one or more devices including the camera-enabled device based on monitoring the physical environment, the one or more inputs comprising a video input, an image input, or an audio input, or any combination thereof. In some examples, the analysis component 685 may analyze the one or more inputs using one or more learning models. In some examples, the classification component 690 may determine a classification of an event or a localization of the event, or both, based on analyzing the one or more inputs. In some examples, performing the operation is based on the classification of the event or the localization of the event, or both. In some examples, the input component 665 may input the one or more inputs to a machine learning module of the camera-enabled device. In some examples, the classification component 690 may output, from the machine learning module, one or more outputs indicating a classification of the one or more inputs or a localization of the one or more inputs, or a combination thereof.

The location component 635 may determine a reference location for the entity based on the one or more parameters. In some examples, the operation component 675 may illuminate, via a light source associated with the camera-enabled device, at least a portion of the physical environment based on determine the reference location, where the portion of the physical environment is between an actual location of the entity and the reference location. In some examples, the emission component 630, the operation component 675, or other components, or a combination thereof, may emit a sound, emit a light, spray water, release a drone, emit one or more lasers, project or capture an image or video or both, send a message to a user of the security and automation system, activate one or more lighting sources, or a combination thereof based on the identity of the entity. In some examples, the emitted sound or the emitted light, or both are targeted to the entity.

The operation component 675 may sweep a light of the camera-enabled device across the physical environment, strobe the light, flash the light, or a combination thereof based on operating in a second mode. In some examples, the threshold component 680 may determine that the entity has remained in the physical environment for a threshold duration of time. In some examples, the parameter component 650 may adjust one or more parameters of the light based on determining that the entity has remained in the physical environment for the threshold duration of time. In some examples, the emission component 630 may emit a sound in the physical environment based on operating in a second mode. In some examples, the threshold component 680 may determine that the entity has remained in the physical environment for a threshold duration of time. In some examples, the parameter component 650 may adjust one or more parameters of the sound based on determining that the entity has remained in the physical environment for the threshold duration of time.

The operation component 675 may perform the operation for a first temporal period. In some examples, the analysis component 685 may analyze, for the first temporal period, the behavior of the entity based on performing the operation. In some examples, the parameter component 650 may adjust one or more parameters of the operation based on the analyzing. In some examples, the threshold component 680 may determine that the behavior of the entity satisfies one or more thresholds. In some examples, the operation component 675 may perform a second operation using the camera-enabled device based on the behavior of the entity satisfying the one or more thresholds. In some examples, the operation component 675 may cease performing the operation based on the behavior of the entity satisfying the one or more thresholds. In some examples, the analysis component 685 may analyze a result of the operation. In some examples, the operation component 675 may adjust the setting of the security and automation system based on analyzing the result. In some examples, the operation component 675 may perform a second operation different than the operation using the camera-enabled device based on the camera-enabled device operating in a second mode of the set of modes and the adjusted setting. In some examples, the first mode corresponds to a first security level and a second mode corresponds to a second security level different from the first security level.

Figure 7:
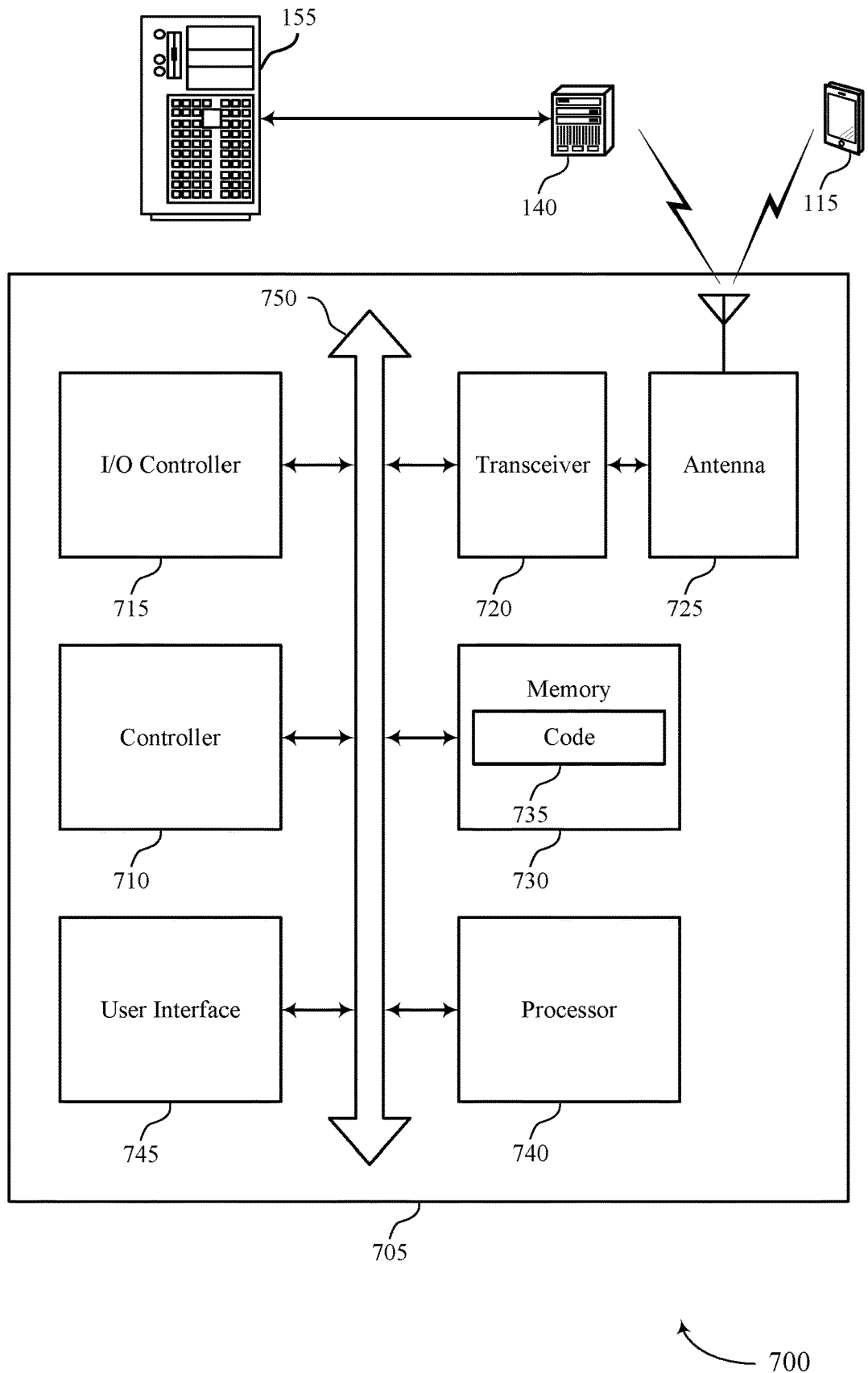
FIG. 7 shows a diagram of a system including a device that supports a smart monitoring system in accordance with aspects of the present disclosure.

FIG. 7 shows a diagram of a system 700 including a device 705 that supports a smart monitoring system in accordance with aspects of the present disclosure. The device 705 may be an example of or include the components of a device 255, a device 355, a device 405, a device 505, or a control panel 135, a local computing device 120, a server 155, or a remote computing device 140 as described herein. The device 705 may include components for bidirectional voice and data communications including components for transmitting and receiving communications, including a controller 710, an I/O controller 715, a transceiver 720, an antenna 725, memory 730, a processor 740, and a user interface 745. These components may be in electronic communication via one or more buses (e.g., bus 750).

The device 705 may communicate with a remote computing device 140, and/or a remote server (e.g., a server 155). For example, one or more elements of the device 705 may provide a direct connection to the server 155 via a direct network link to the Internet via a POP (point of presence). In some cases, one element of the device 705 (e.g., one or more antennas, transceivers, etc.) may provide a connection using wireless techniques, including digital cellular telephone connection, Cellular Digital Packet Data (CDPD) connection, digital satellite data connection, and/or another connection. Many other devices and/or subsystems may be connected to one or may be included as one or more elements of the system 700 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some cases, all of the elements shown in FIG. 7 need not be present to practice the present systems and methods. The devices and subsystems may also be interconnected in different ways from that shown in FIG. 7. In some cases, an aspect of the operations of the system 700 may be readily known in the art and are not discussed in detail in this disclosure.

The signals associated with the system 700 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or Long Term Evolution (LTE), for example), and/or other signals. The radio access technology (RAT) of the system 700 may be related to, but are not limited to, wireless wide area network (WWAN) (GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RFID and UWB). In some cases, one or more sensors (e.g., motion, proximity, smoke, light, glass break, door, window, carbon monoxide, and/or another sensor) may connect to some element of the system 700 via a network using the one or more wired and/or wireless connections.

The controller 710 may monitor a physical environment using a camera-enabled device, detect a trigger in the physical environment based on the monitoring, where the trigger includes an object, a person, an event, or any combination thereof, select, based on the detecting, a direction of a set of directions to emit light via a light emitting source, activate the light emitting source based on the selecting, and emit, via the light emitting source, the light in the direction based on the activating and the detected trigger.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases, the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor 740 to perform various functions described herein. In some cases, the memory 730 may contain, among other things, a basic input/output system (BIOS) which may control basic hardware or software operation such as the interaction with peripheral components or devices.

The code 735 may include instructions to implement aspects of the present disclosure, including instructions to support intruder detection. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting a smart monitoring system).

The user interface 745 may enable a user to interact with the device 705. In some cases, the user interface 745 may include an audio device, such as an external speaker system. In some cases the user interface 745 may include a keyboard, a mouse, a touchscreen, an external display device such as a display screen, or an input device (e.g., a remote control device interfaced with the user interface 745 directly or through the I/O controller 715).

Figure 8:
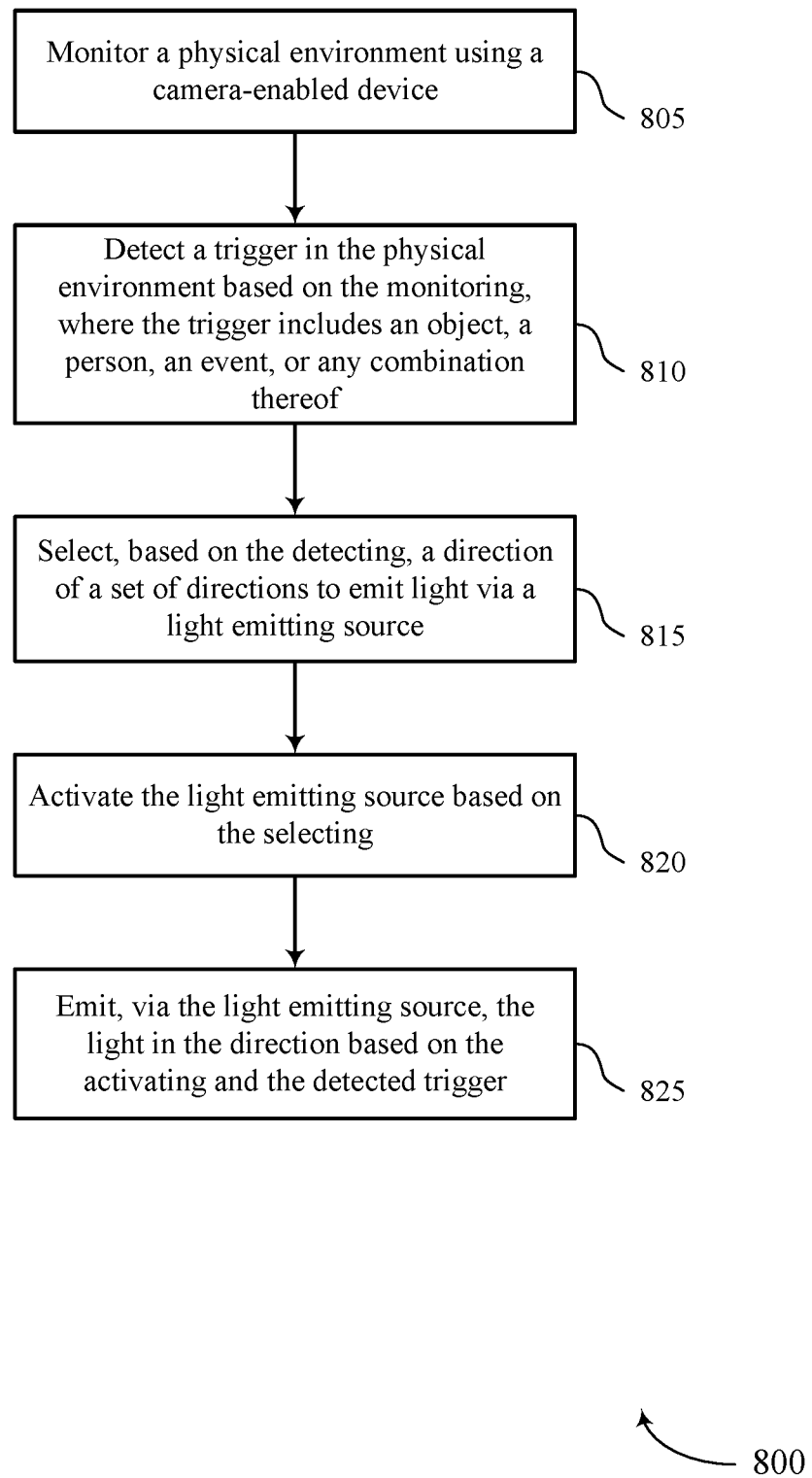
FIGS. 8 through 12 show flowcharts illustrating methods that support a smart monitoring system in accordance with aspects of the present disclosure.

FIG. 8 shows a flowchart illustrating a method 800 that supports smart monitoring system in accordance with aspects of the present disclosure. The operations of method 800 may be implemented by a device or its components as described herein. For example, the operations of method 800 may be performed by a controller as described with reference to FIGS. 5 through 7. In some examples, the device may execute a set of instructions to control the functional elements of the device to perform the described functions. Additionally or alternatively, the device may perform aspects of the described functions using special-purpose hardware.

At 805, the device may monitor a physical environment using a camera-enabled device. The operations of 805 may be performed according to the methods described herein. In some examples, aspects of the operations of 805 may be performed by a monitoring component as described with reference to FIGS. 4 through 7.

At 810, the device may detect a trigger in the physical environment based on the monitoring, where the trigger includes an object, a person, an event, or any combination thereof. The operations of 810 may be performed according to the methods described herein. In some examples, aspects of the operations of 810 may be performed by a detection component as described with reference to FIGS. 4 through 7.

At 815, the device may select, based on the detecting, a direction of a set of directions to emit light via a light emitting source. The operations of 815 may be performed according to the methods described herein. In some examples, aspects of the operations of 815 may be performed by a selection component as described with reference to FIGS. 4 through 7.

At 820, the device may activate the light emitting source based on the selecting. The operations of 820 may be performed according to the methods described herein. In some examples, aspects of the operations of 820 may be performed by an activation component as described with reference to FIGS. 4 through 7.

At 825, the device may emit, via the light emitting source, the light in the direction based on the activating and the detected trigger. The operations of 825 may be performed according to the methods described herein. In some examples, aspects of the operations of 825 may be performed by an emission component as described with reference to FIGS. 4 through 7.

Figure 9:
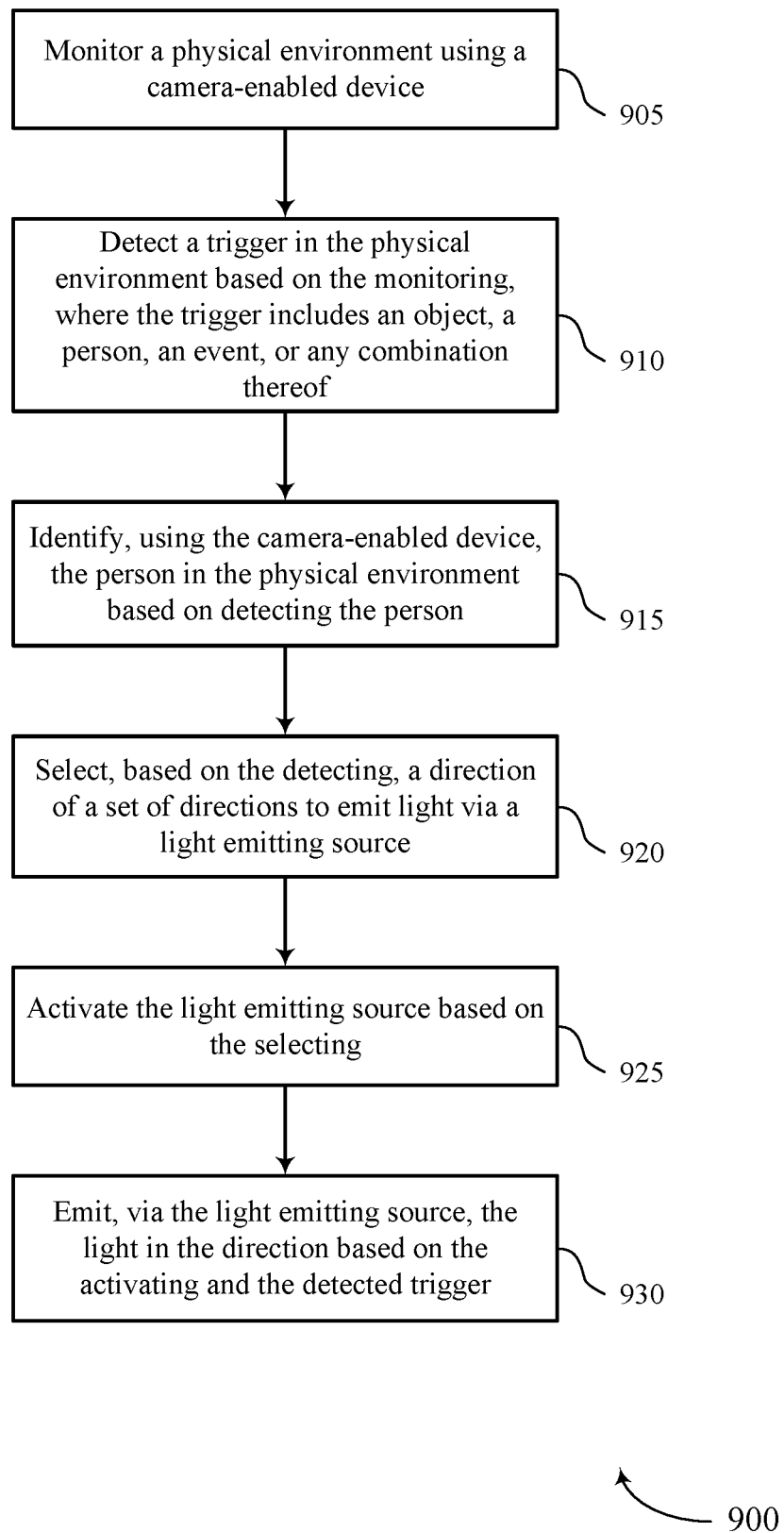

FIG. 9 shows a flowchart illustrating a method 900 that supports smart monitoring system in accordance with aspects of the present disclosure. The operations of method 900 may be implemented by a device or its components as described herein. For example, the operations of method 900 may be performed by a controller as described with reference to FIGS. 4 through 7. In some examples, a device may execute a set of instructions to control the functional elements of the device to perform the described functions. Additionally or alternatively, a device may perform aspects of the described functions using special-purpose hardware.

At 905, the device may monitor a physical environment using a camera-enabled device. The operations of 905 may be performed according to the methods described herein. In some examples, aspects of the operations of 905 may be performed by a monitoring component as described with reference to FIGS. 4 through 7.

At 910, the device may detect a trigger in the physical environment based on the monitoring, where the trigger includes an object, a person, an event, or any combination thereof. The operations of 910 may be performed according to the methods described herein. In some examples, aspects of the operations of 910 may be performed by a detection component as described with reference to FIGS. 4 through 7.

At 915, the device may identify, using the camera-enabled device, the person in the physical environment based on detecting the person. The operations of 915 may be performed according to the methods described herein. In some examples, aspects of the operations of 915 may be performed by an identification component as described with reference to FIGS. 4 through 7.

At 920, the device may select, based on the detecting, a direction of a set of directions to emit light via a light emitting source. The operations of 920 may be performed according to the methods described herein. In some examples, aspects of the operations of 920 may be performed by a selection component as described with reference to FIGS. 4 through 7.

At 925, the device may activate the light emitting source based on the selecting. The operations of 925 may be performed according to the methods described herein. In some examples, aspects of the operations of 925 may be performed by an activation component as described with reference to FIGS. 4 through 7.

At 930, the device may emit, via the light emitting source, the light in the direction based on the activating and the detected trigger. The operations of 930 may be performed according to the methods described herein. In some examples, aspects of the operations of 930 may be performed by an emission component as described with reference to FIGS. 4 through 7.

Figure 10:
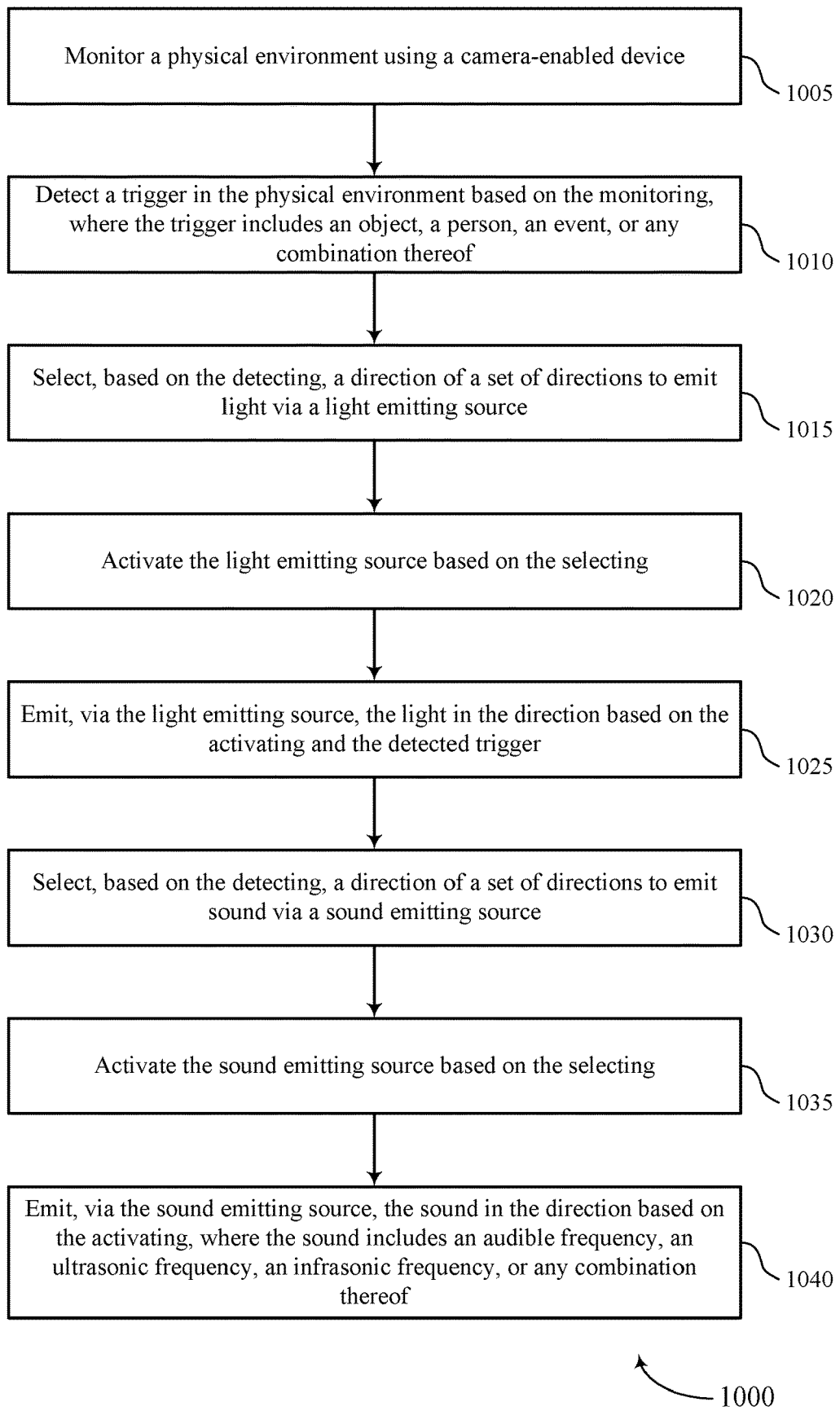

FIG. 10 shows a flowchart illustrating a method 1000 that supports smart monitoring system in accordance with aspects of the present disclosure. The operations of method 1000 may be implemented by a device or its components as described herein. For example, the operations of method 1000 may be performed by a controller as described with reference to FIGS. 4 through 7. In some examples, a device may execute a set of instructions to control the functional elements of the device to perform the described functions. Additionally or alternatively, a device may perform aspects of the described functions using special-purpose hardware.

At 1005, the device may monitor a physical environment using a camera-enabled device. The operations of 1005 may be performed according to the methods described herein. In some examples, aspects of the operations of 1005 may be performed by a monitoring component as described with reference to FIGS. 4 through 7.

At 1010, the device may detect a trigger in the physical environment based on the monitoring, where the trigger includes an object, a person, an event, or any combination thereof. The operations of 1010 may be performed according to the methods described herein. In some examples, aspects of the operations of 1010 may be performed by a detection component as described with reference to FIGS. 4 through 7.

At 1015, the device may select, based on the detecting, a direction of a set of directions to emit light via a light emitting source. The operations of 1015 may be performed according to the methods described herein. In some examples, aspects of the operations of 1015 may be performed by a selection component as described with reference to FIGS. 4 through 7.

At 1020, the device may activate the light emitting source based on the selecting. The operations of 1020 may be performed according to the methods described herein. In some examples, aspects of the operations of 1020 may be performed by an activation component as described with reference to FIGS. 4 through 7.

At 1025, the device may emit, via the light emitting source, the light in the direction based on the activating and the detected trigger. The operations of 1025 may be performed according to the methods described herein. In some examples, aspects of the operations of 1025 may be performed by an emission component as described with reference to FIGS. 4 through 7.

At 1030, the device may select, based on the detecting, a direction of a set of directions to emit sound via a sound emitting source. The operations of 1030 may be performed according to the methods described herein. In some examples, aspects of the operations of 1030 may be performed by a sound component as described with reference to FIGS. 4 through 7.

At 1035, the device may activate the sound emitting source based on the selecting. The operations of 1035 may be performed according to the methods described herein. In some examples, aspects of the operations of 1035 may be performed by a sound component as described with reference to FIGS. 4 through 7.

At 1040, the device may emit, via the sound emitting source, the sound in the direction based on the activating, where the sound includes an audible frequency, an ultrasonic frequency, an infrasonic frequency, or any combination thereof. The operations of 1040 may be performed according to the methods described herein. In some examples, aspects of the operations of 1040 may be performed by a sound component as described with reference to FIGS. 4 through 7.

Figure 11:
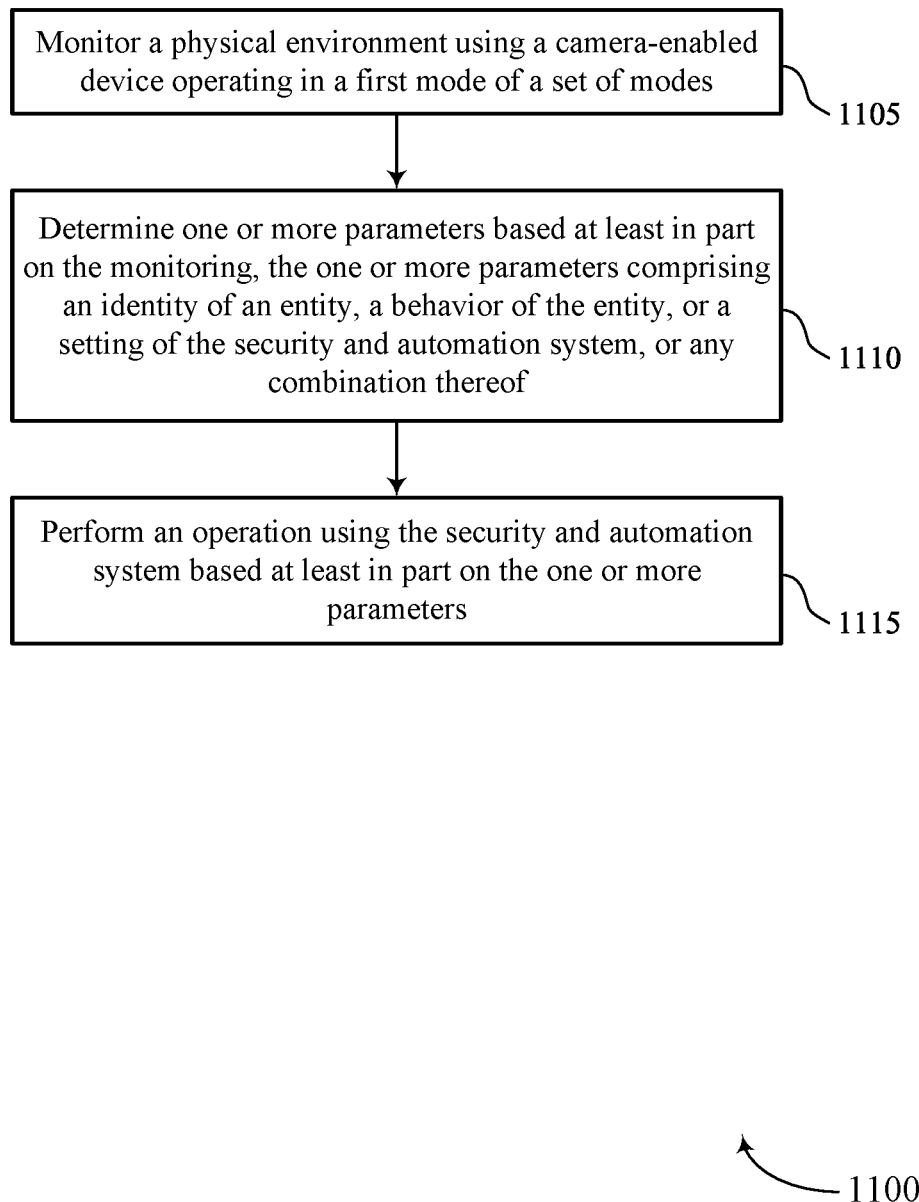

FIG. 11 shows a flowchart illustrating a method 1100 that supports smart monitoring system in accordance with aspects of the present disclosure. The operations of method 1100 may be implemented by a device or its components as described herein. For example, the operations of method 1100 may be performed by a controller as described with reference to FIGS. 4 through 7. In some examples, a device (e.g., one or more devices of a security and/or automation system) may execute a set of instructions to control the functional elements of the device to perform the described functions. Additionally or alternatively, a device may perform aspects of the described functions using special-purpose hardware.

At 1105, the device may monitor a physical environment using a camera-enabled device operating in a first mode of a set of modes. The operations of 1105 may be performed in accordance with examples as disclosed herein. In some examples, aspects of the operations of 1105 may be performed by a monitoring component as described with reference to FIGS. 4-7.

At 1110, the device may determine one or more parameters based at least in part on the monitoring, the one or more parameters comprising an identity of an entity, a behavior of the entity, or a setting of the security and automation system, or any combination thereof. The operations of 1110 may be performed in accordance with examples as disclosed herein. In some examples, aspects of the operations of 1110 may be performed by a parameter component as described with reference to FIGS. 4-7.

At 1115, the device may perform an operation using the security and automation system based at least in part on the one or more parameters. The operations of 1115 may be performed in accordance with examples as disclosed herein. In some examples, aspects of the operations of 1115 may be performed by an operation component as described with reference to FIGS. 4-7.

Figure 12:
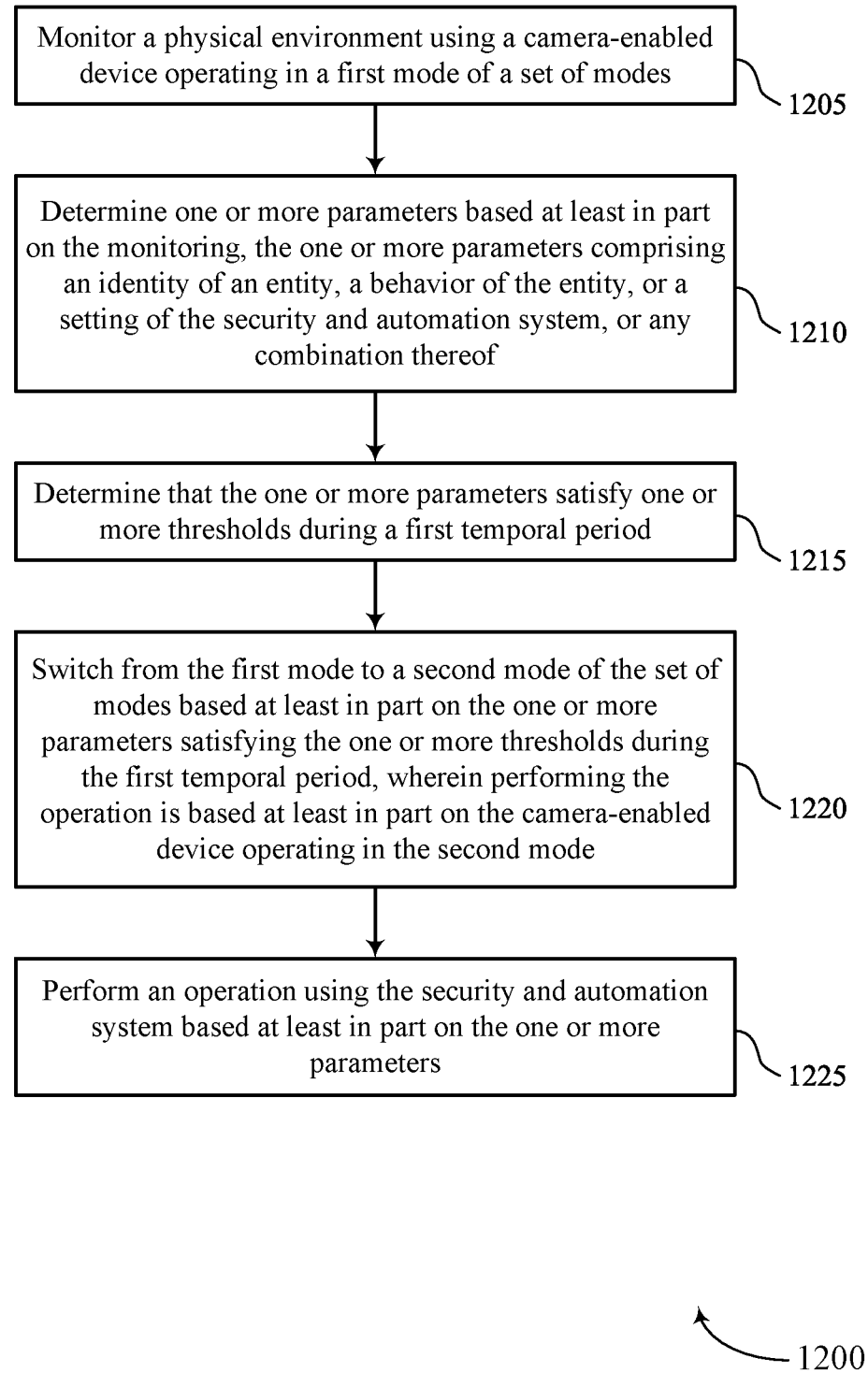

FIG. 12 shows a flowchart illustrating a method 1200 that supports smart monitoring system in accordance with aspects of the present disclosure. The operations of method 1200 may be implemented by a device or its components as described herein. For example, the operations of method 1200 may be performed by a controller as described with reference to FIGS. 4 through 7. In some examples, a device (e.g., one or more devices of a security and/or automation system) may execute a set of instructions to control the functional elements of the device to perform the described functions. Additionally or alternatively, a device may perform aspects of the described functions using special-purpose hardware.

At 1205, the device may monitor a physical environment using a camera-enabled device operating in a first mode of a set of modes. The operations of 1205 may be performed in accordance with examples as disclosed herein. In some examples, aspects of the operations of 1205 may be performed by a monitoring component as described with reference to FIGS. 4 through 7.

At 1210, the device may determine one or more parameters based at least in part on the monitoring, the one or more parameters comprising an identity of an entity, a behavior of the entity, or a setting of the security and automation system, or any combination thereof. The operations of 1210 may be performed in accordance with examples as disclosed herein. In some examples, aspects of the operations of 1210 may be performed by a parameter component as described with reference to FIGS. 4 through 7.

At 1215, the device may determine that the one or more parameters satisfy one or more thresholds during a first temporal period. The operations of 1215 may be performed in accordance with examples as disclosed herein. In some examples, aspects of the operations of 1215 may be performed by a threshold component as described with reference to FIGS. 4 through 7.

At 1220, the device may switch from the first mode to a second mode of the set of modes based at least in part on the one or more parameters satisfying the one or more thresholds during the first temporal period, wherein performing the operation is based at least in part on the camera-enabled device operating in the second mode. The operations of 1220 may be performed in accordance with examples as disclosed herein. In some examples, aspects of the operations of 1220 may be performed by an operation mode component as described with reference to FIGS. 4 through 7.

At 1225, the device may perform an operation using the security and automation system based at least in part on the one or more parameters. The operations of 1225 may be performed in accordance with examples as disclosed herein. In some examples, aspects of the operations of 1225 may be performed by an operation component as described with reference to FIGS. 4 through 7.

The detailed description set forth herein in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. A method for a security and automation system, comprising:
    monitoring a physical environment using a camera-enabled device operating in a first mode of a set of modes, wherein the first mode corresponds to a first security level and a second mode corresponds to a second security level different from the first security level;
    determining one or more parameters based at least in part on the monitoring, the one or more parameters comprising an identity of an entity, a behavior of the entity, or a setting of the security and automation system, or any combination thereof;
    performing an operation using the security and automation system based at least in part on the one or more parameters;
    determining that the one or more parameters satisfy one or more thresholds during a first temporal period; and
    switching from the first mode to the second mode of the set of modes based at least in part on the one or more parameters satisfying the one or more thresholds during the first temporal period, wherein performing the operation is based at least in part on the camera-enabled device operating in the second mode.

2. The method of claim 1, further comprising:
    determining, during a second temporal period, that the one or more parameters fail to satisfy the one or more thresholds; and
    switching from the second mode to the first mode during the second temporal period based at least in part on the one or more parameters failing to satisfy the one or more thresholds.

3. The method of claim 1, further comprising:
    receiving one or more inputs from one or more devices including the camera-enabled device based at least in part on monitoring the physical environment, the one or more inputs comprising a video input, an image input, or an audio input, or any combination thereof, wherein determining the one or more parameters comprises:
    analyzing the one or more inputs using one or more learning models.

4. The method of claim 3, further comprising:
    determining a classification of an event or a localization of the event, or both, based at least in part on analyzing the one or more inputs,
    wherein performing the operation is based at least in part on the classification of the event or the localization of the event, or both.

5. The method of claim 3, wherein analyzing the one or more inputs comprises:
    inputting the one or more inputs to a machine learning module of the camera-enabled device; and outputting, from the machine learning module, one or more outputs indicating a classification of the one or more inputs or a localization of the one or more inputs, or a combination thereof.

6. The method of claim 1, wherein performing the operation comprises:
determining a reference location for the entity based at least in part on the one or more parameters; and
illuminating, via a light source associated with the camera-enabled device, at least a portion of the physical environment based at least in part on determining the reference location, wherein the portion of the physical environment is between an actual location of the entity and the reference location.

7. The method of claim 1, wherein performing the operation comprises:
emitting a sound, emitting a light, spraying water, releasing a drone, emitting one or more lasers, projecting or capturing an image or video or both, sending a message to a user of the security and automation system, activating one or more lighting sources, or a combination thereof based at least in part on the identity of the entity, wherein the emitted sound or the emitted light, or both are targeted to the entity.

8. The method of claim 1, wherein performing the operation comprises:
sweeping a light of the camera-enabled device across the physical environment, strobing the light, flashing the light, or a combination thereof based at least in part on operating in the second mode.

9. The method of claim 8, further comprising:
determining that the entity has remained in the physical environment for a threshold duration of time; and
adjusting one or more parameters of the light based at least in part on determining that the entity has remained in the physical environment for the threshold duration of time.

10. The method of claim 1, wherein performing the operation comprises:
emitting a sound in the physical environment based at least in part on operating in the second mode.

11. The method of claim 10, further comprising:
determining that the entity has remained in the physical environment for a threshold duration of time; and
adjusting one or more parameters of the sound based at least in part on determining that the entity has remained in the physical environment for the threshold duration of time.

12. The method of claim 1, further comprising:
performing the operation for a first temporal period;
analyzing, for the first temporal period, the behavior of the entity based at least in part on performing the operation; and
adjusting one or more parameters of the operation based at least in part on the analyzing.

13. The method of claim 12, further comprising:
determining that the behavior of the entity satisfies one or more thresholds.

14. The method of claim 13, wherein adjusting the one or more parameters comprises:
performing a second operation using the camera-enabled device based at least in part on the behavior of the entity satisfying the one or more thresholds.

15. The method of claim 13, wherein adjusting the one or more parameters comprises:
ceasing performing the operation based at least in part on the behavior of the entity satisfying the one or more thresholds.

16. The method of claim 1, further comprising:
analyzing a result of the operation;
adjusting the setting of the security and automation system based at least in part on analyzing the result; and
performing a second operation different than the operation using the camera-enabled device based at least in part on the camera-enabled device operating in the second mode of the set of modes and the adjusted setting.

17. An apparatus for a security and automation system, comprising:
a processor;
memory coupled with the processor; and
instructions stored in the memory and executable by the processor to cause the apparatus to:
monitor a physical environment using a camera-enabled device operating in a first mode of a set of modes, wherein the first mode corresponds to a first security level and a second mode corresponds to a second security level different from the first security level;
determine one or more parameters based at least in part on the monitoring, the one or more parameters comprising an identity of an entity, a behavior of the entity, or a setting of the security and automation system, or any combination thereof;
perform an operation using the security and automation system based at least in part on the one or more parameters;
determine that the one or more parameters satisfy one or more thresholds during a first temporal period; and
switch from the first mode to the second mode of the set of modes based at least in part on the one or more parameters satisfying the one or more thresholds during the first temporal period, wherein performing the operation is based at least in part on the camera-enabled device operating in the second mode.

18. A non-transitory computer-readable medium storing code for a security and automation system, the code comprising instructions executable by a processor to:
monitor a physical environment using a camera-enabled device operating in a first mode of a set of modes, wherein the first mode corresponds to a first security level and a second mode corresponds to a second security level different from the first security level;
determine one or more parameters based at least in part on the monitoring, the one or more parameters comprising an identity of an entity, a behavior of the entity, or a setting of the security and automation system, or any combination thereof;
perform an operation using the security and automation system based at least in part on the one or more parameters;
determine that the one or more parameters satisfy one or more thresholds during a first temporal period; and
switch from the first mode to the second mode of the set of modes based at least in part on the one or more parameters satisfying the one or more thresholds during the first temporal period, wherein performing the operation is based at least in part on the camera-enabled device operating in the second mode.

* * * * *